US008695035B2

(12) United States Patent
Sakao et al.

(10) Patent No.: US 8,695,035 B2
(45) Date of Patent: Apr. 8, 2014

(54) INFORMATION PROCESSING APPARATUS

(75) Inventors: Katsutoshi Sakao, Kanagawa (JP); Nobutaka Tani, Saitama (JP); Satoru Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 280 days.

(21) Appl. No.: 12/703,244

(22) Filed: Feb. 10, 2010

(65) Prior Publication Data

US 2010/0175030 A1 Jul. 8, 2010

Related U.S. Application Data

(63) Continuation of application No. 10/477,724, filed as application No. PCT/JP02/04634 on May 14, 2002, now Pat. No. 7,690,014.

(30) Foreign Application Priority Data

May 16, 2001 (JP) ................................ 2001-146867

(51) Int. Cl.
*G06F 3/00* (2006.01)

(52) U.S. Cl.
USPC .......... 725/37; 725/1; 725/8; 725/25; 725/48; 725/51

(58) Field of Classification Search
USPC ................................ 725/37, 48, 51, 25, 1, 8
See application file for complete search history.

(56) References Cited

U.S. PATENT DOCUMENTS

| | | | | |
|---|---|---|---|---|
| 5,202,828 | A | 4/1993 | Vertelney et al. | |
| 5,485,221 | A | 1/1996 | Banker et al. | |
| 5,815,145 | A | 9/1998 | Matthews, III | |
| 5,841,468 | A * | 11/1998 | Wright | 725/119 |
| 5,875,304 | A | 2/1999 | Winter et al. | |
| 5,887,191 | A * | 3/1999 | Adiga et al. | 710/5 |
| 5,903,314 | A | 5/1999 | Niijima et al. | |
| 5,923,379 | A | 7/1999 | Patterson | |
| 5,961,603 | A * | 10/1999 | Kunkel et al. | 709/229 |
| 5,996,015 | A * | 11/1999 | Day et al. | 709/226 |
| 6,005,565 | A | 12/1999 | Legall et al. | |
| 6,057,888 | A | 5/2000 | Bril | |
| 6,141,003 | A | 10/2000 | Chor et al. | |
| 6,219,042 | B1 | 4/2001 | Anderson et al. | |
| 6,263,503 | B1 | 7/2001 | Margulis | |

(Continued)

FOREIGN PATENT DOCUMENTS

| | | |
|---|---|---|
| EP | 0 961 490 | 12/1999 |
| EP | 1 093 305 | 4/2001 |

(Continued)

*Primary Examiner* — James R Sheleheda
*Assistant Examiner* — Sahar Baig
(74) *Attorney, Agent, or Firm* — Frommer Lawrence & Haug LLP; William S. Frommer

(57) ABSTRACT

The present invention relates to an information processing apparatus with improved operatability. With the information processing apparatus in which the user is capable of watching a television program and connecting to the Internet, the index panel 1 shows channel buttons 2 to be operated to select a desired program, a site button 71 to be operated to make an access to site A available on the Internet and a site button 72 to be operated to make an access to site B on the Internet. The present invention allows the user to watch a television program and can be applied to an information processing apparatus such as a personal computer, which can be connected to the Internet.

6 Claims, 20 Drawing Sheets

(56) References Cited

U.S. PATENT DOCUMENTS

| | | | | |
|---|---|---|---|---|
| 6,268,849 | B1 | 7/2001 | Boyer et al. | |
| 6,348,932 | B1 | 2/2002 | Nishikawa et al. | |
| 6,367,080 | B1 | 4/2002 | Enomoto et al. | |
| 6,990,676 | B1 * | 1/2006 | Proehl et al. | 725/40 |
| 7,373,650 | B1 | 5/2008 | Rodriguez et al. | |
| 2001/0016947 | A1 * | 8/2001 | Nishikawa et al. | 725/51 |
| 2002/0060750 | A1 * | 5/2002 | Istvan et al. | 348/569 |

FOREIGN PATENT DOCUMENTS

| | | |
|---|---|---|
| GB | 2 343 073 | 4/2000 |
| JP | 5-134832 | 6/1993 |
| JP | 11-32272 | 2/1999 |
| JP | 2000-13779 | 1/2000 |
| JP | 2001-16518 | 1/2001 |
| JP | 2001-54081 | 2/2001 |
| JP | 2001-111940 | 4/2001 |
| JP | 2002-518749 | 6/2002 |
| WO | WO 98 17064 | 4/1998 |
| WO | WO 98 26584 | 6/1998 |
| WO | WO 99/66436 | 12/1999 |
| WO | WO 00/33576 | 6/2000 |

* cited by examiner

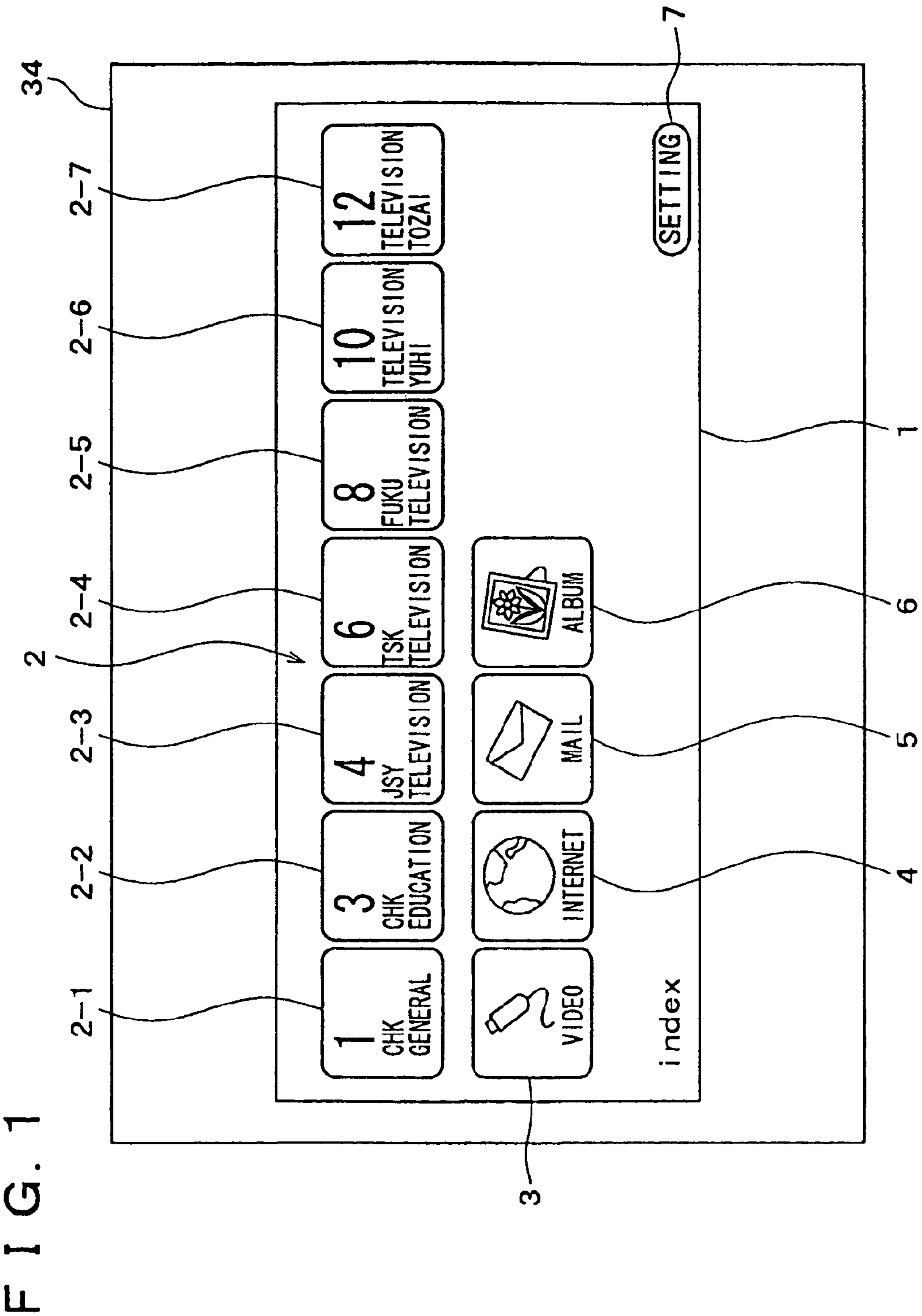
F I G. 1

F I G. 7
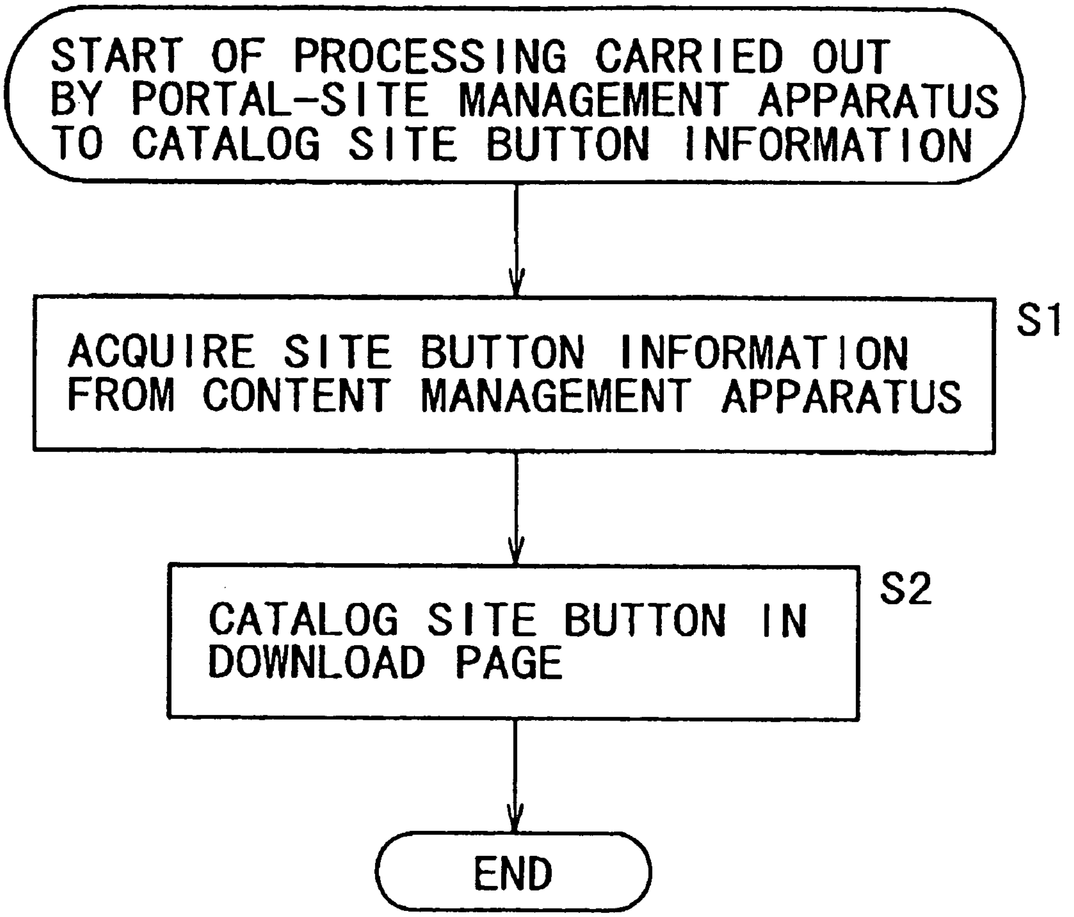

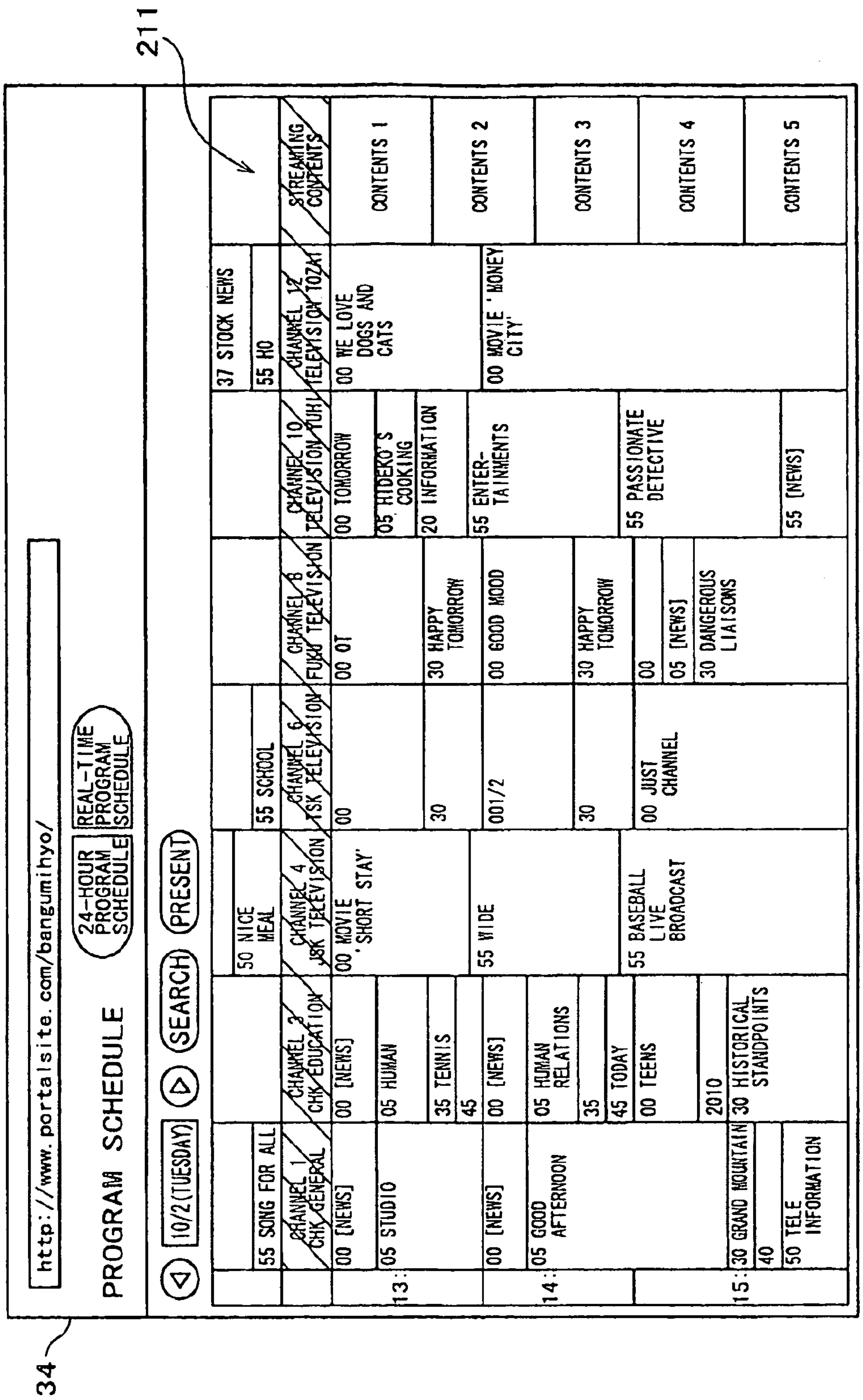

FIG. 14

| http://www.portalsite.com/bangumihyo/ | | | | | | |
|---|---|---|---|---|---|---|
| PROGRAM SCHEDULE (24-HOUR PROGRAM SCHEDULE) (REAL-TIME PROGRAM SCHEDULE) | | | | | | |
| ▽ 10/2(TUESDAY) △ (SEARCH) (PRESENT) | | | | | | |

| | CHANNEL 1 CHK-GENERAL | CHANNEL 2 CHK-EDUCATION | CHANNEL 4 JSK TELEVISION | CHANNEL 6 TSK TELEVISION | CHANNEL 8 FUKU TELEVISION | CHANNEL 10 TUHI TELEVISION | CHANNEL 12 TELEVISION TOZAI | STREAMING CONTENTS |
|---|---|---|---|---|---|---|---|---|
| | 55 SONG FOR ALL | | 50 NICE MEAL | 55 SCHOOL | | | 37 STOCK NEWS | |
| 13: | 00 [NEWS] 05 STUDIO | 00 [NEWS] 05 HUMAN 35 TENNIS 45 | 00 MOVIE 'SHORT STAY' 55 WIDE | 00 30 | 00 OT 30 HAPPY TOMORROW | 00 TOMORROW 05 HIDEKO'S COOKING 20 INFORMATION | 55 HO CHANNEL 12 TELEVISION TOZAI 00 WE LOVE DOGS AND CATS | CONTENTS 1 |
| 14: | 00 [NEWS] 05 GOOD AFTERNOON | 00 [NEWS] 05 HUMAN RELATIONS 35 45 TODAY 00 TEENS | | 00 1/2 30 | 00 GOOD MOOD 30 HAPPY TOMORROW | 55 ENTER-TAINMENTS 55 PASSIONATE DETECTIVE | 00 MOVIE 'MONEY CITY' | CONTENTS 2 |
| 15: | 30 GRAND MOUNTAIN 40 50 TELE INFORMATION | 2010 30 HISTORICAL STANDPOINTS | | 00 JUST CHANNEL | 00 05 [NEWS] 30 DANGEROUS LIAISONS | 55 [NEWS] | | CONTENTS 3 |
| | | | | 55 BASEBALL LIVE BROADCAST | | | | CONTENTS 4 |
| | | | | | | | | CONTENTS 5 |

211 (arrow pointing to STREAMING CONTENTS)

34

F I G. 1 9
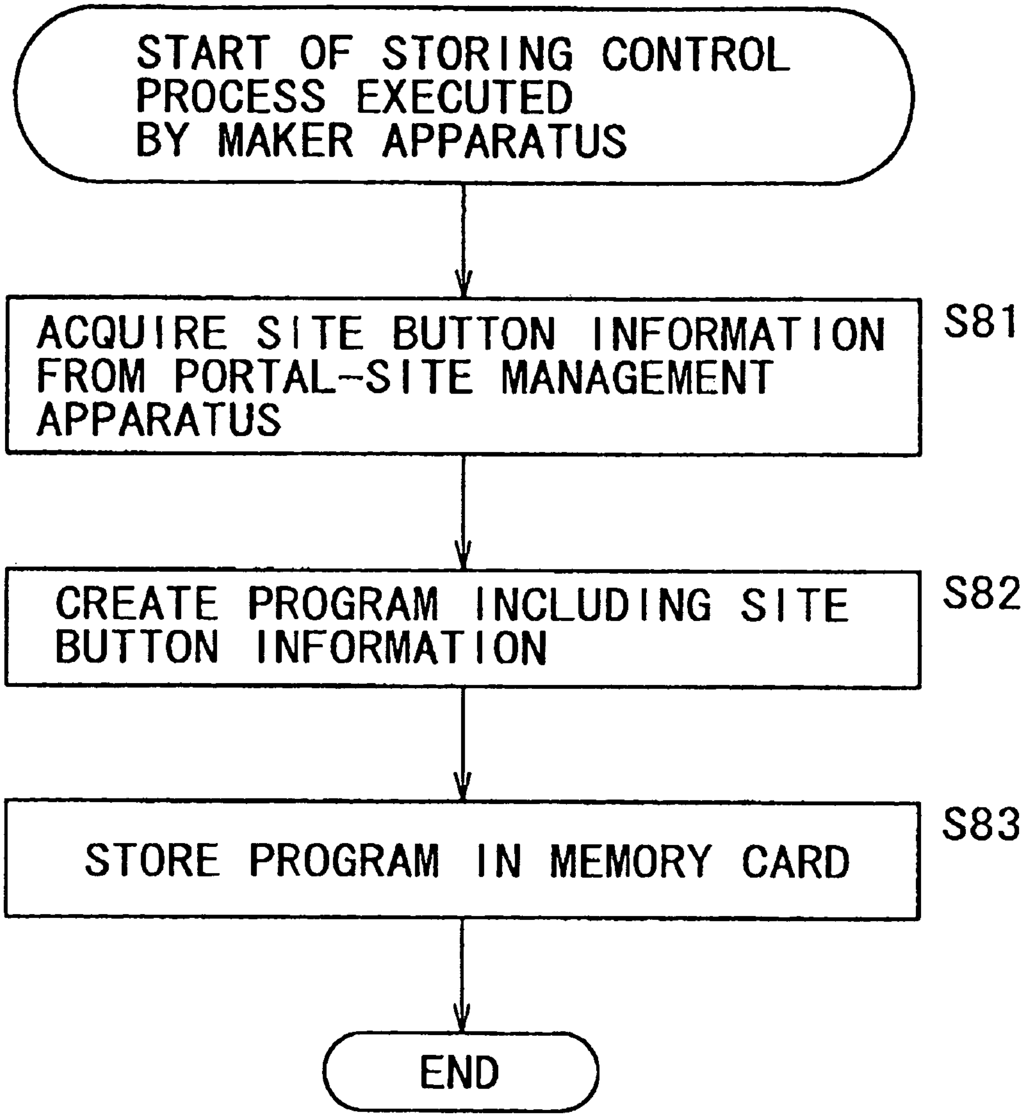

INFORMATION PROCESSING APPARATUS

This is a continuation of application Ser. No. 10/477,724, filed Mar. 22, 2004 under 35 USC 371 from International Application PCT/JP02/04634, filed May 14, 2002, which is entitled to the priority filing date of Japanese applications 2001-146867 filed on May 16, 2001, the entirety of which is incorporated herein by reference.

TECHNICAL FIELD

The present invention relates to an information processing apparatus and, more particularly, relates to an information processing apparatus with improved operatability.

BACKGROUND ART

In recent years, with development of technologies, there has been proposed a variety of ways to display a television program and a web page made available on the Internet on the screen of a single apparatus by switching the screen from the television program to the web page or vice versa.

There also exists an apparatus having not only functions to watch a television program and inspect a web page, but also other functions such as a function to watch a video program, functions to send and receive emails and an album function to display a static picture stored on a predetermined storage medium.

In addition, the apparatus having such a variety of functions is also provided with a predetermined button to be operated in order to display an index panel (or an operation panel) on a display unit so as to allow the user to switch from one function to another with ease.

FIG. 1 is a diagram showing a typical display of the conventional index panel.

On the top row of the index panel 1, there are displayed channel buttons 2 to be operated in order to switch the screen from a displayed television program to another. From the left to the right on the second row, there are displayed a video button 3, an Internet button 4, a mail button 5 and an album button 6. The video button 3 is a button to be operated in order to switch to a video input. The Internet button 4 is a button to be operated in order to establish a connection with the Internet. The mail button 5 is a button to be operated in order to send or receive an email. The album button 6 is a button to be operated in order to display a static picture.

Thus, even while the user is watching a television program, the user is allowed to display the index panel 1 and, for example, operate the Internet button 4 to establish a connection with the Internet so that a web page can be displayed.

With such an index panel 1, however, there is raised a problem of an incapability of directly displaying a desired web page.

That is to say, in order for the user to display a desired web page with a television program appearing on the screen, the user must carry out operations to first display the index panel 1 and then operate the Internet button 4 before selecting the desired web site among those cataloged in a bookmark or the like.

Thus, by separately providing the index panel 1 with a button allowing a direct access to a desired web site to be made in the same way as an access, which is made when the channel of a television program is switched from one to another, further improvement of the operatability can be expected.

In addition, in the present state where development of network technologies eliminates a fence between television programs and contents (or web pages) made available on the Internet, it is desirable to provide a capability of displaying contents in the same way as displaying a selected television program.

DISCLOSURE OF INVENTION

It is thus an object of the present invention addressing the above problems to improve the operatability of an apparatus capable of displaying both television programs and web pages.

An information processing apparatus provided by the present invention is characterized in that the information processing apparatus includes display processing means for displaying a first operation button to be operated in order to display a predetermined television program conveyed by a television broadcast wave and a second operation button to be operated in order to make an access to a specific content on a network, wherein the first and second operation buttons are displayed on the same screen.

The apparatus may further provide acquisition means for acquiring operation button information required for displaying the second operation button.

The acquisition means can be used for acquiring the operation button information from an information providing apparatus for providing the operation button information by way of the network.

The acquisition means can also be used for acquiring the operation button information from a predetermined storage medium for recording the operation button information.

The apparatus may further provide charging means for charging a fee for the operation button information.

An information processing method provided by the present invention is characterized in that the information processing method includes a display processing step of displaying a first operation button to be operated in order to display a predetermined television program conveyed by a television broadcast wave and a second operation button to be operated in order to make an access to a specific content on a network, wherein the first and second operation buttons are displayed on the same screen.

A first recording medium provided by the present invention as a recording medium for recording a program is characterized in that the program includes a display processing step of displaying a first operation button to be operated in order to display a predetermined television program conveyed by a television broadcast wave and a second operation button to be operated in order to make an access to a specific content on a network, wherein the first and second operation buttons are displayed on the same screen.

A first program provided by the present invention is characterized in that the first program includes a display processing step of displaying a first operation button to be operated in order to display a predetermined television program conveyed by a television broadcast wave and a second operation button to be operated in order to make an access to a specific content on a network. The first and second operation buttons are displayed on the same screen.

An information providing apparatus provided by the present invention is characterized in that the information providing apparatus includes: storage means for storing operation button information required for displaying a second operation button to be operated in order to display a specific content on a network on the same screen in an information processing apparatus as a first operation-button to be operated in order to select a predetermined television program conveyed by a television broadcast wave; and providing means for providing the operation button information stored in the storage means to the information processing apparatus.

An information providing method provided by the present invention is characterized in that the information providing method includes: a storage step of storing operation button information required for displaying a second operation button to be operated in order to make an access to a specific content on a network on the same screen in an information processing apparatus as a first operation button to be operated in order to select a predetermined television program conveyed by a television broadcast wave; and a providing step of providing the operation button information stored in processing carried out at the storage step to the information processing apparatus.

The method may further provide a charging step of charging a fee for the operation button information provided at the providing step to the information processing apparatus.

The method may further provide a step of pre-installing the operation button information in the information processing apparatus.

The method may further provide a charging step of charging a fee for pre-installation of the operation button information in the information processing apparatus to another information processing apparatus.

The method may further provide a formation step of forming guide times of streaming contents to be displayed in the information processing apparatus in accordance with an operation carried out on the second operation button.

At the formation step, the guide times of streaming contents are formed in accordance with the user of the information processing apparatus.

A second recording medium provided by the present invention as a recording medium for recording a program is characterized in that the program includes: a storage control step of controlling an operation to store operation button information required for displaying a second operation button to be operated in order to display a predetermined content on the same screen in an information processing apparatus as a first operation button to be operated in order to select a predetermined television program conveyed by a television broadcast wave; and an information providing control step of controlling an operation to provide the operation button information stored in processing carried out at the storage control step to the information processing apparatus.

A second program provided by the present invention is characterized in that the second program includes: a storage control step of controlling an operation to store operation button information required for displaying a second operation button to be operated in order to display a predetermined content on the same screen in an information processing apparatus as a first operation button to be operated in order to select a predetermined television program conveyed by a television broadcast wave; and an information providing control step of controlling an operation to provide the operation button information stored in processing carried out at the storage control step to the information processing apparatus.

In accordance with the information processing apparatus, the information processing method, the recording medium and the program, which are provided by the present invention, a first operation button to be operated in order to display a predetermined television program conveyed by a television broadcast wave as well as a second operation button to be operated in order to make an access to a specific content on a network are displayed and, in addition, the first and second operation buttons are displayed on the same screen.

In accordance with the information providing apparatus, the information providing method, the recording medium and the program, which are provided by the present invention, operation button information is provided to an information processing apparatus to be stored therein as information required for displaying a second operation button to be operated in order to display a specific content on the same screen as a first operation button to be operated in order to display a predetermined television program conveyed by a television broadcast wave.

BRIEF DESCRIPTION OF DRAWINGS

FIG. 1 is a diagram showing a typical display of the conventional index panel;

FIG. 7 shows a flowchart representing a process carried out by the portal-site management apparatus;

FIG. 14 is a diagram showing a still further typical display appearing on the display apparatus;

FIG. 19 shows a flowchart representing another process carried out by the maker apparatus.

BEST MODE FOR CARRYING OUT INVENTION

Figure 2:
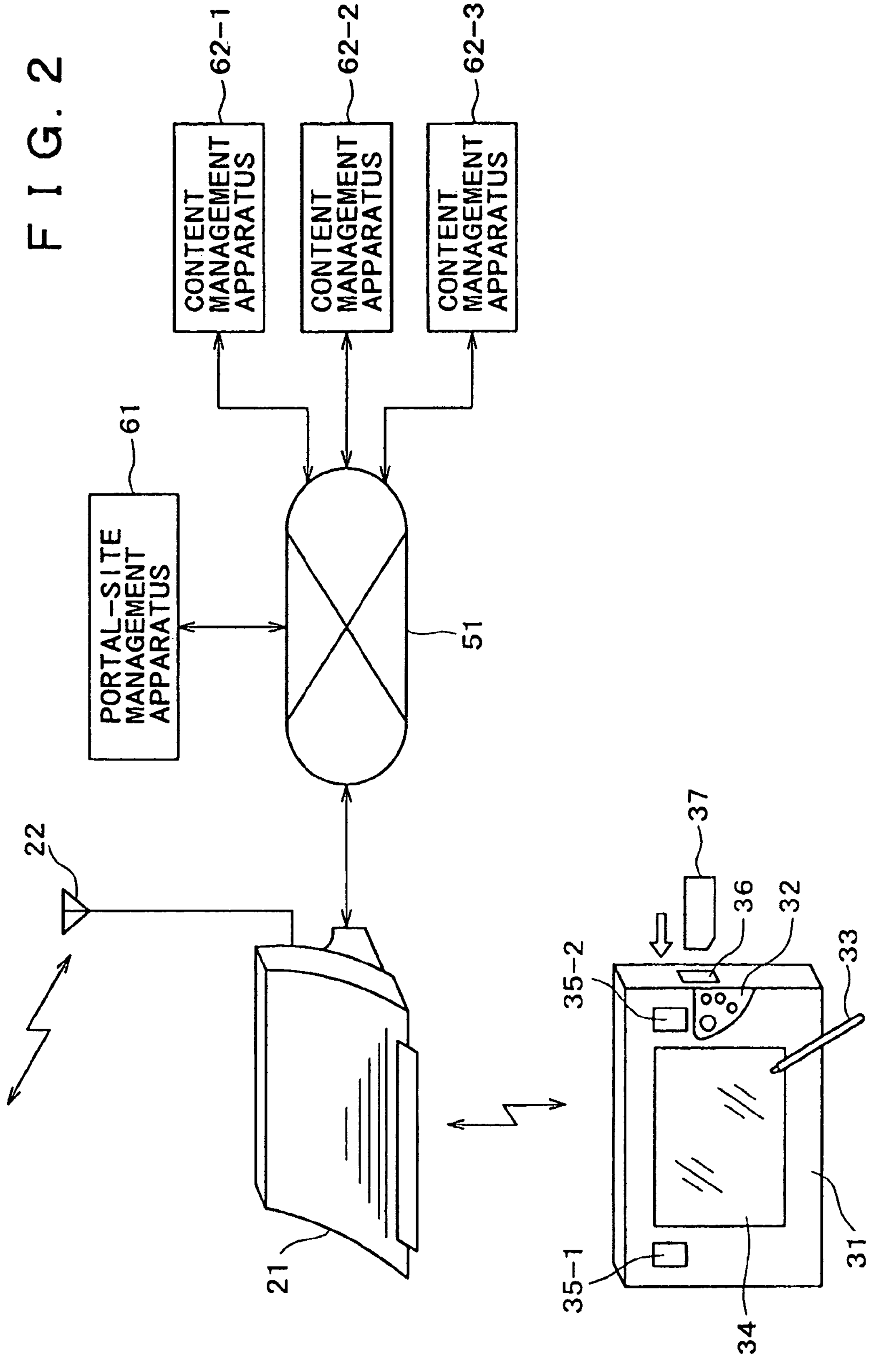
FIG. 2 is a diagram showing a typical configuration of an information providing system to which the present invention is applied.

FIG. 2 is a diagram showing a typical configuration of an information providing system to which the present invention is applied.

Figure 4:
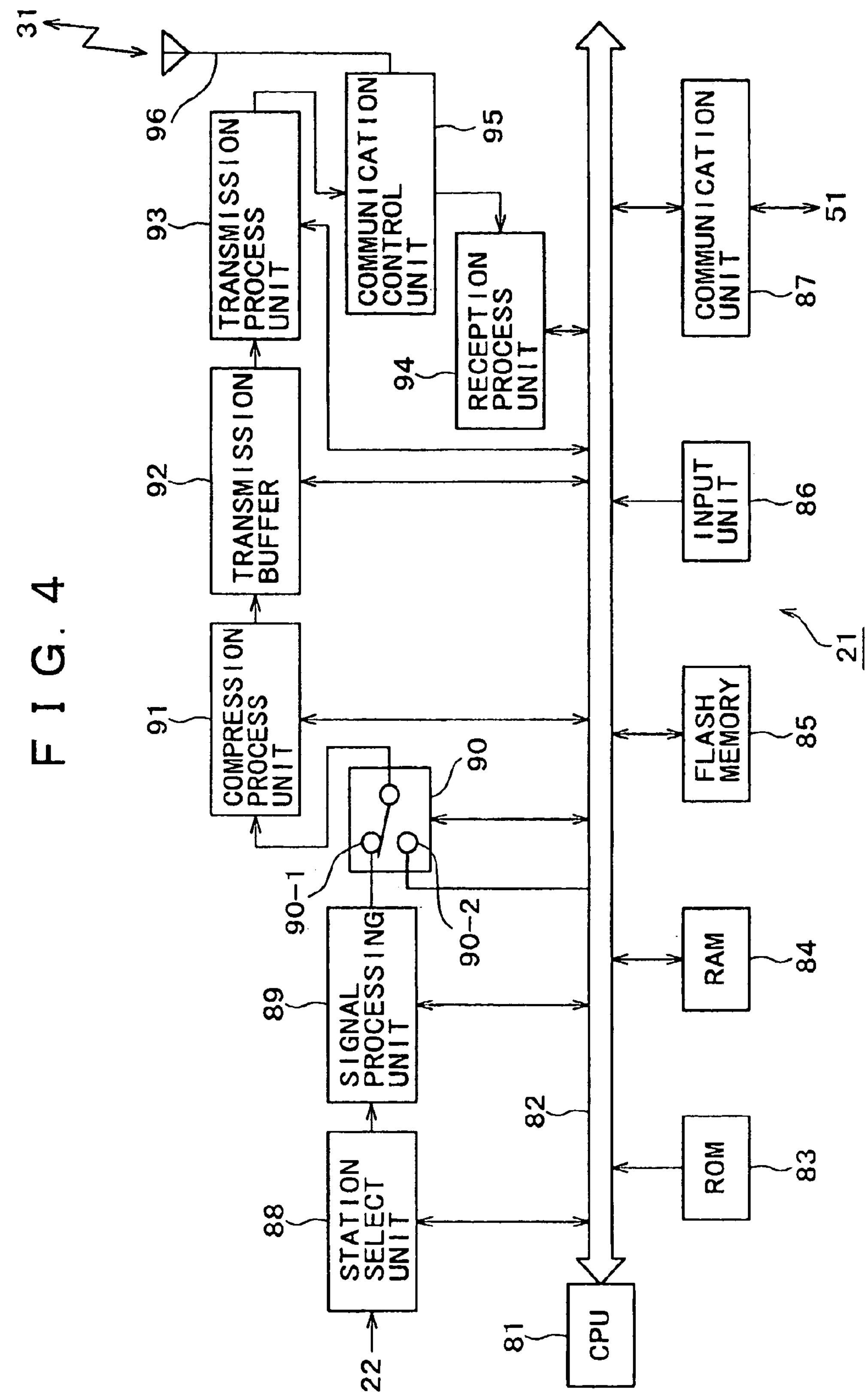
FIG. 4 is a block diagram showing a typical configuration of a base station shown in FIG. 2.

As shown in FIG. 4, a base station 21 has a communication antenna 96 allowing radio communications with a display apparatus 31 to be carried out.

In addition, the base station 21 also has a television-broadcast reception antenna 22, which makes the base station 21 capable of receiving a television broadcast wave of a selected channel specified by information received from the display apparatus 31. Then, the base station 21 extracts a program signal from the received television broadcast wave and converts the extracted program signal into a digital signal. Subsequently, the base station 21 compresses the digital signal in an MPEG (Moving Picture Experts Group)-2 format before finally transmitting the compressed signal to the display apparatus 31 by radio communication from the communication antenna 96.

In the display apparatus 31, the program data transmitted by the base station 21 is decompressed and reproduced to display images of a program on an LCD 34 and output sounds to speakers 35-1 and 35-2. On the other hand, carrying the display apparatus 31, the user is capable of specifying a channel or another item by operating a variety of operation buttons provided on an operation unit 32 or using a touch pen 33. Thus, the user is capable of watching a television program while freely moving from a location to another.

In addition, the base station 21 is also connected to the Internet 51 by a network such as a public-line network. Accordingly, the base station 21 is capable of acquiring data described in a language such as an HTML (Hyper Text Markup Language) by making an access to a portal-site management apparatus 61 also connected to the Internet 51. Such an access is made by specifying a URL (Uniform Resource Locator) entered by the user to the display apparatus 31 to be transmitted by the display apparatus 31 to the base station 21.

Much like a television program, the acquired data is transmitted to the display apparatus 31 to be displayed on the LCD 34. As a result, while freely moving from a location to another, the user is capable of utilizing the display apparatus 31 to use a variety of contents provided by content management apparatus 62-1 to 62-3 in the same way as watching a television program.

In addition, by using the display apparatus 31, the user is also capable of sending as well as receiving emails and displaying a static image, which is stored in a memory card 37 mounted on a memory card slot 36 as a storage medium, on the LCD 34.

In the following description, both the base station 21 and the display apparatus 31 are referred to simply as an information processing apparatus in case it is not necessary to distinguish the base station 21 and the display apparatus 31 from each other.

By operating an index display button provided on the operation unit 32, the user is capable of carrying out operations such as an operation to change a displayed television program to another and an operation to display an index panel on the LCD 34. The index panel is used for selecting a function among a variety of functions of the information processing apparatus. The functions of the information processing apparatus include a television-program inspection function, a web-page inspection function and an email function.

Figure 3:
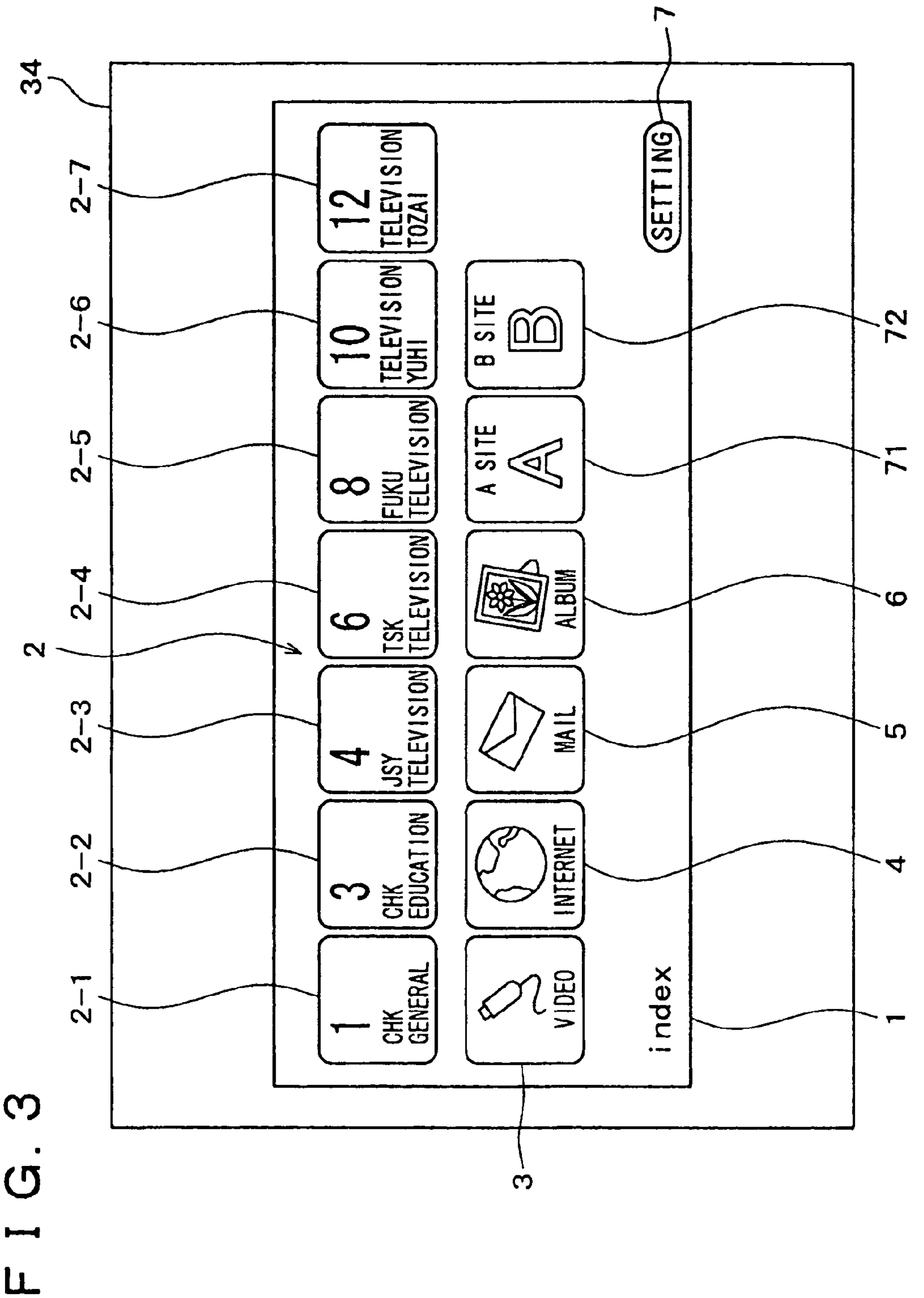
FIG. 3 is a diagram showing a typical display of an index panel.

FIG. 3 is a diagram showing a typical display of an index panel 1 appearing on the LCD 34. Elements identical with their respective counterparts shown in FIG. 1 are denoted by the same reference numerals as the counterparts. It is to be noted that, if the user operates an index-panel display button while watching a television program, the index panel 1 is displayed, being superposed on the video of the program.

On the top row of the index panel 1, there are displayed channel buttons 2 to be operated in order to activate the television-program inspection function for selecting a television program.

The channel buttons 2 are channel buttons 2-1 to 2-7, which are arranged from the left to the right. The channel button 2-1 is a channel button to be operated in order to display a program broadcasted by a 'CHK General' channel. The channel button 2-2 is a channel button to be operated in order to display a program broadcasted by a 'CHK Education' channel. The channel button 2-3 is a channel button to be operated in order to display a program broadcasted by a 'JSY Television' channel. The channel button 2-4 is a channel button to be operated in order to display a program broadcasted by a 'TSK Television' channel. The channel button 2-5 is a channel button to be operated in order to display a program broadcasted by a 'Fuku Television' channel. The channel button 2-6 is a channel button to be operated in order to display a program broadcasted by a 'Television Yuhi' channel. The channel button 2-7 is a channel button to be operated in order to display a program broadcasted by a 'Television Tozai' channel.

Figure 5:
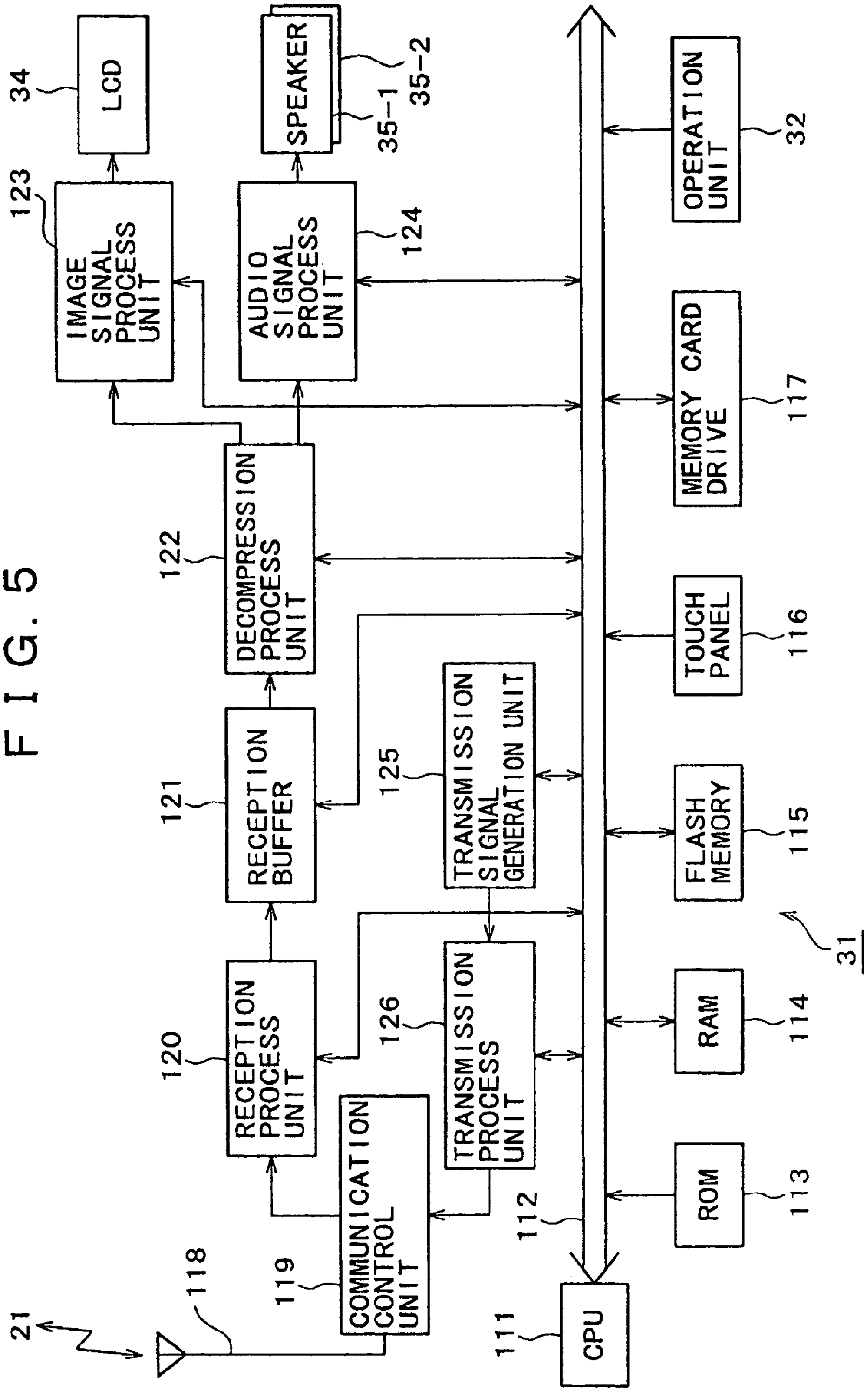
FIG. 5 is a block diagram showing a typical configuration of a display apparatus shown in FIG. 2.

By applying the touch pen 33 to a touch panel 116 shown in FIG. 5, the user is capable of selecting desired channel among the channels represented by the channel buttons 2. The touch panel 116 is a layer stacked on the LCD 34.

At the left end of the second row of the index panel 1, there is displayed a video button 3 to be operated in order to display a video signal or the like supplied by a signal source connected to the base station 21. Examples of the signal source, which is shown in none of the figure, are a video recorder and a DVD (Digital Versatile Disc) player.

At an adjacent location on the right side of the video button 3, there is displayed an Internet button 4 to be operated in order to establish a connection with the Internet 51 by dialing up a predetermined Internet provider. When the Internet button 4 is operated, typically, an access to the portal-site management apparatus 61 is made to display a portal site (or a web page) managed by the portal-site management apparatus 61 on the LCD 34.

Then, referring to various kinds of information displayed on the portal site, for example, the user is allowed to enter typically a keyword of a desired content in order to utilize a content managed by the content management apparatus 62-1 to 62-3, that is, in order to display a web page on the LCD 34.

At an adjacent location on the right side of the Internet button 4, a mail button 5 is displayed. By operating the mail button 5 by using the touch pen 33, the user is capable of sending and receiving emails to and from a variety of apparatus connected to the Internet 51.

At an adjacent location on the right side of the mail button 5, an album button 6 is displayed. When the user mounts a memory card 37 used for storing static pictures on the memory card slot 36 and then operates the album button 6, the user is capable of displaying the static pictures stored in the memory card 37 on the LCD 34.

At an adjacent location on the right side of the album button 6, there is displayed a site button 71 to be operated in order to make an access to site A so as to display a screen of site A. At an adjacent location on the right side of the site button 71, there is displayed a site button 72 to be operated in order to make an access to site B so as to display a screen of site B.

By operating the site button 71 or 72, the user is capable of directly displaying a picture of site A or B without operating the Internet button 4 to make an access to the portal-site management apparatus 61 and carry out a predetermined search operation.

Figure 13:
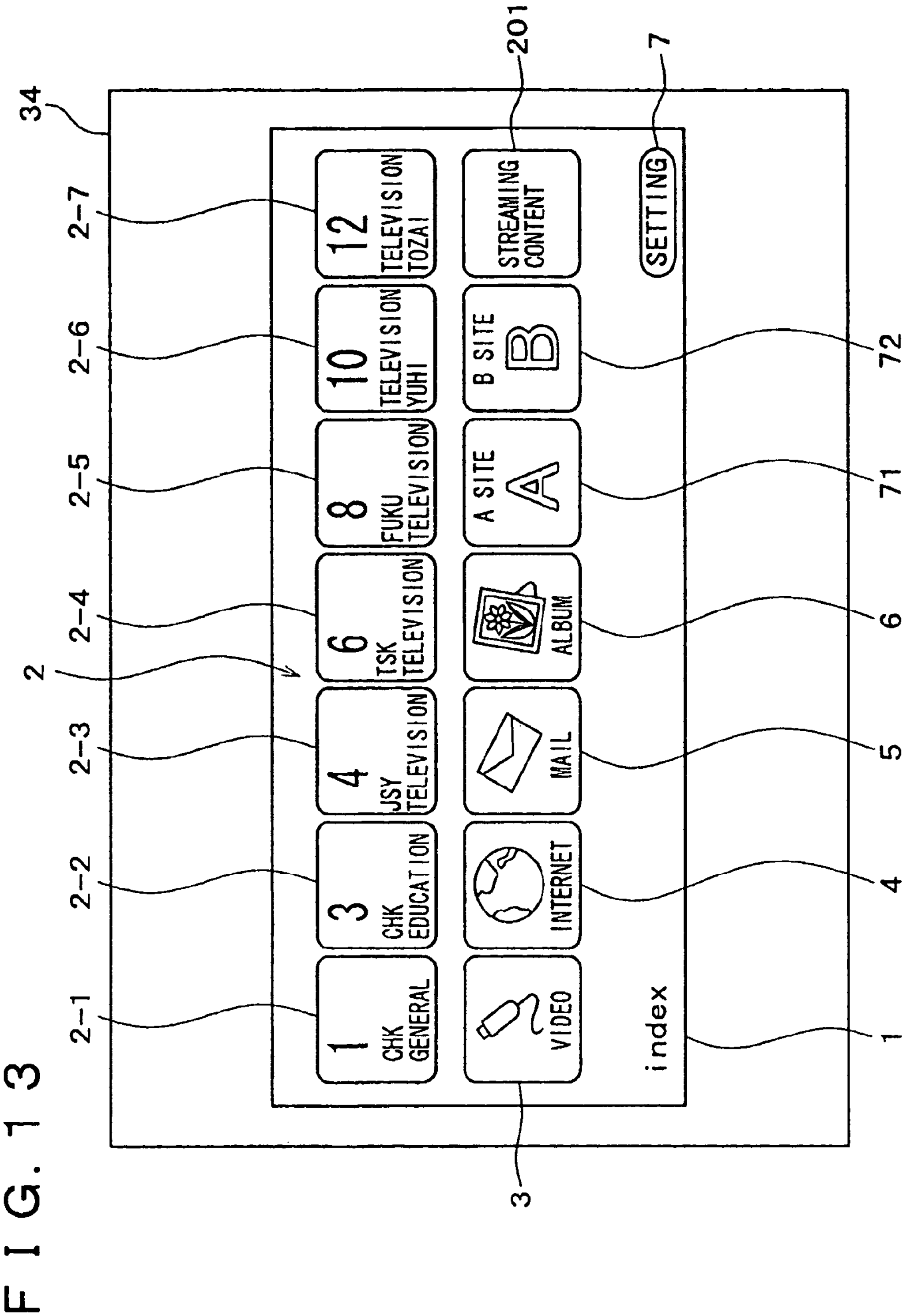
FIG. 13 is a diagram showing a further typical display appearing on the display apparatus.

It is to be noted that information on the site button 71 or 72 can be downloaded from, for example, the portal-site management apparatus 61 as will be described later. The site button 71, the site button 72 and a streaming content button 201 to be described later by referring to FIG. 13 are referred to hereafter simply as a site button if it is not necessary to distinguish them from each other. Thus, a site button can be interpreted as a button to be operated in order to make a direct access to a web site.

In the example shown in FIG. 3, on the lower right portion of the index panel 1, there is displayed a setting button 7 to be operated in order to carry out various kinds of setting.

By operating such an index panel 1, the user is capable of selecting a television program or a web site to be accessed.

Refer back to FIG. 2. The portal-site management apparatus 61 acquires contents provided by the content management apparatus 62-1 to 62-3 and address information. The portal-site management apparatus 61 also manages portal sites for giving various kinds of information to the user of the information processing apparatus. In addition, the portal-site management apparatus 61 carries out processes to keep a plurality of pieces of information on a site button, provide the information on a site button at a request made by the user and collect a fee for the provided information on a site button.

The content management apparatus 62-1 to 62-3 create and manage contents such as a content of a web site and a streaming content, which are described typically in a language such as the HTML. In addition, the content management apparatus 62-1 to 62-3 also create information on a site button. Such information on a site button allows the information processing apparatus to make a direct access to a site managed by the content management apparatus 62-1 to 62-3. The content management apparatus 62-1 to 62-3 catalog the information on a site button in the portal-site management apparatus 61.

Next, configurations of the base station 21, the display the apparatus 31 and the portal-site management apparatus 61 are explained.

FIG. 4 is a block diagram showing a typical configuration of the base, station 21 shown in FIG. 2.

In accordance with a command entered from an input unit 86 and a command received from the display apparatus 31 through the communication antenna 96, a CPU (Central Processing Unit) 81 loads a control program stored in a ROM (Read Only Memory) 83 into a RAM (Random Access Memory) 84 and executes the control program to control operations of other components connected to a bus 82.

A flash memory 85 is a non-volatile memory used for storing various kinds of data. The input unit 86 includes a mouse and a keyboard, outputting a signal representing an input entered by the user to the CPU 81.

A communication unit 87 includes a modem and/or a terminal adaptor, transmitting and receiving various kinds of information to and from a variety of information processing apparatus connected to the Internet 51. The communication unit 87 passes on an acquired HTML file and data such as information on a site button downloaded from the portal-site management apparatus 61 to a changeover switch 90.

A station select unit 88 extracts a predetermined program signal from a television broadcast wave received by the television-broadcast transmission/reception antenna 22 on the basis of a command issued by the CPU 81. The station select unit 88 then supplies the extracted program signal to a signal processing unit 89 for carrying out processes on the program signal. The processes include demodulation processing, amplification processing and analog-to-digital conversion processing. The signal processing unit 89 supplies a result of the processes to a changeover switch 90.

The changeover switch 90 selects either its terminal 90-1 or 90-2 for receiving data to be supplied to a compression process unit 91. Assume for example that the user makes a request for a reproduction of a television program by operating the display apparatus 31. In this case, the changeover switch 90 passes on the data of the television program received from the signal processing unit 89 to the compression process unit 91 in accordance with a command received from the CPU 81. If the user makes a request for a display of a web page by operating the display apparatus 31, on the other hand, the changeover switch 90 passes on an HTML file received from the bus 82 to the compression process unit 91.

By adoption of a predetermined method, the compression process unit 91 compresses the television program data or the HTML file received from the changeover switch 90 and supplies data obtained as a result of the compression process to a transmission buffer 92. The communication buffer 92 then outputs the data received from the compression process unit 91 to a transmission process unit 93 with a timing determined by the CPU 81.

The transmission process unit 93 carries out processes on the data received from the communication buffer 92 and outputs a signal obtained as a result of the processes to a communication control unit 95. The processes include modulation processing and digital-to-analog conversion processing. The communication control unit 95 transmits the signal received from the transmission process unit 93 to the display apparatus 31 by way of the communication antenna 96 by adopting a radio communication method conforming to typically the IEEE (Institute of Electrical and Electronics Engineers) 802.11b.

A reception process unit 94 carries out processes such as demodulation processing and digital-to-analog conversion processing on a signal received from the communication control unit 95, which has received the signal from the display apparatus 31 through the communication antenna 96. An example of the signal is the URL of a web server to be accessed. The reception process unit 94 then supplies a result of the processes to the CPU 81 by way of the bus 82.

FIG. 5 is a block diagram showing a typical configuration of the display apparatus 31 shown in FIG. 2.

In accordance with a signal received from the operation unit 32 or the touch panel 116, a CPU 111 loads a control program stored in a ROM 113 into a RAM 114 and executes the program to control all operations of the display apparatus 31.

A flash memory 115 is used for storing various kinds of information such as the address of a web site. The address of a web site is an address cataloged by the user in the bookmark or an address, which is accessed when the site button described above is operated.

The touch panel 116 is stacked on the LCD 34 as a layer. When the user touches a position on the touch panel 116 by using a touch pen 33, the touch panel 116 detects the touched position and supplies information on the detected position to the CPU 111.

In accordance with a command received from the CPU 111, a memory card drive 117 reads out and writes various kinds of data into and from a memory card 37 inserted into the memory card slot 36. For example, the memory card driver 117 reads out information on a site button from the memory card 37 and supplies the information to components such as the flash memory 115.

The operation unit 32 includes a variety of buttons to be operated by the user to enter a variety of inputs. The operation unit 32 supplies an entered input to the CPU 111. The operation unit 32 includes an index display button to be operated in order to display the index panel 1 like the one shown in FIG. 3.

A communication control unit 119 transmits a signal received from a transmission process unit 126 to the base station 21 by way of a communication antenna 118. On the other hand, the communication control unit 119 receives a signal from the base station 21 through the communication antenna 118 and supplies the signal to a reception process unit 120.

The reception process unit 120 carries out processes on an analog signal received from the communication control unit 119. The processes include amplification processing, demodulation processing and analog-to-digital conversion processing. The reception process unit 120 then supplies digital data obtained as a result of the analog-to-digital conversion processing to a reception buffer 121.

The reception buffer 121 then outputs the data received from the reception process unit 120 to a decompression process unit 122 with a predetermined timing.

If the data received from the reception buffer 121 is compressed data, the decompression process unit 122 decompresses the data and converts the decompressed digital data into analog picture and audio signal. The picture signal is output to a picture signal process unit 123 and the audio signal is supplied to an audio signal process unit 124.

The picture signal process unit 123 displays the picture signal received from the decompression process unit 122 typically on the LCD 34. On the other hand, the audio signal process unit 124 outputs the audio signal received from the decompression process unit 122 to speakers 35-1 and 35-2. With the configuration described above, a television program signal received from the base station 21 by radio communication in a state of being compressed by adoption of typically the MPEG2 method is reproduced and displayed to the user.

Figure 6:
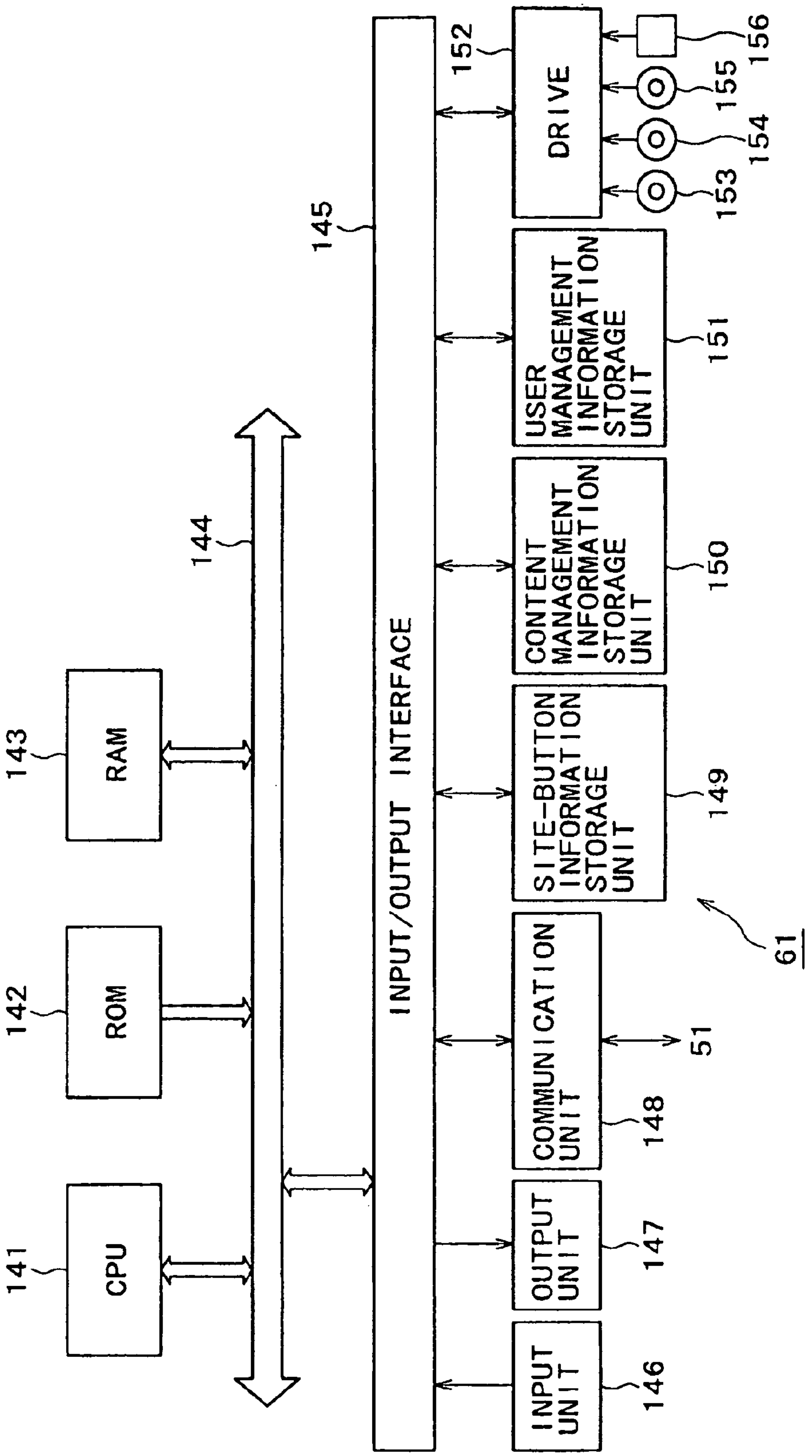
FIG. 6 is a block diagram showing a typical configuration of a portal-site management apparatus shown in FIG. 2.

FIG. 6 is a block diagram showing a typical configuration of the portal-site management apparatus 61.

A CPU 141 loads a control program stored in a ROM 142 into a RAM 143 and executes the program to control all operations of the portal-site management apparatus 61. The RAM 143 is also used properly for storing data required by the CPU 141 in the execution of various kinds of processing.

The CPU 141, the ROM 142 and the RAM 143 are connected to each other by a bus 144, which is also connected to an input/output interface 145.

The input/output interface 145 is connected to an input unit 146, an output unit 147 and a communication unit 148. Operated by the person in charge of management of the portal-site management apparatus 61, the input unit 146 includes components such as a keyboard and a mouse. The output unit 147 includes components such as a display unit and speakers. The display unit is typically a CRT (Cathode Ray Tube) or an LCD for displaying various kinds of information to the person in charge of management. The communication unit 148 includes components such as a modem and a terminal adapter, which transmit and receive various kinds of information to and from the Internet 51.

The input/output interface 145 is also connected to a site-button information storage unit 149, a content management information storage unit 150 and a user management information storage unit 151.

The site-button information storage unit 149 is used for storing or cataloging information on a site button in a state of being downloadable in accordance with a request received from an information processing apparatus. The information on a site button is provided to the communication unit 148 by typically the content management apparatus 62-1 to 62-3.

The content management information storage unit 150 is typically used for storing content information managed by the content management apparatus 62-1 to 62-3. The content information includes the substance of each content and an address indicating which location the content is stored at. The content management information storage unit 150 provides various kinds of information to a user making an access thereto.

The user management information storage unit 151 is used for storing information on users utilizing portal sites. Typically, the information on a user is stored, being associated with an ID issued in advance for the user. To be more specific, the information on a user includes personal information, historical information of each web site accessed by the user and charging information. The personal information includes the name and address of the user. The charging information includes the number of a credit card to which the fee for downloaded information on a site button is to be charged.

In addition, the input/output interface 145 is connected to a drive 152, on which a recording medium is to be mounted, if necessary. The recording medium mounted on the drive 152 can be a magnetic disc 153, an optical disc 154, a magneto-optical disc 155, a semiconductor memory 156 (that is, the memory card 37) or the like. Data read out from the recording medium is supplied to an appropriate storage unit and other components.

Next, operations carried out by the information providing system shown in FIG. 2 are explained.

First of all; a process carried out by the portal-site management apparatus 61 to catalog information on a site button is described by referring to a flowchart shown in FIG. 7.

At the step S1, the CPU 141 acquires information on a site button from the communication unit 148. One of the Content management apparatus 62-1 to 62-3 has transmitted the information on a site button to the communication unit 148 by way of the Internet 51. Assume for example that the information on a site button has been received from the content management apparatus 62-1. This information on a site button can be used later to make an access to a web site managed by the content management apparatus 62-1. This is because the information on a site button includes the address of the web site.

Then, at the next step S2, the CPU 141 stores the acquired information on a site button in the site-button information storage unit 149 and catalogs the site button on a download page shown in FIG. 10 as a select button to be described later. The download page is a page displayed to the user of the information processing apparatus to allow the user to download the information on a desired site button by operating the select button.

That is to say, in the portal-site management apparatus 61, there has been prepared a web page used for downloading information on a site button. The web page is appropriately referred to hereafter as the download page cited above. By carrying out the process shown in FIG. 7 repeatedly, a plurality of site buttons can be cataloged on the download page and pieces on information on the site buttons can be stored in the site-button information storage unit 149. Thus, the user is capable of downloading desired information on a site button by making an access to the download page.

As described above, the content management apparatus 62-1 to 62-3 provide information on a site button to the portal-site management apparatus 61 by way of the Internet 51. It is to be noted, however, that the information on a site button can also be provided from a predetermined recording medium, which can be any one of the recording mediums including those ranging from the magnetic disc 153 to the semiconductor memory 156 shown in FIG. 6. If the information on a site button is provided from an optical disc 154 such as a CD-ROM (Compact Disc-Read Only Memory) or a DVD, the drive 152 reads out the information from the optical disc 154 and supplies the information to the site-button information storage unit 149 to be stored therein in accordance with control executed by the CPU 141.

Figure 8:
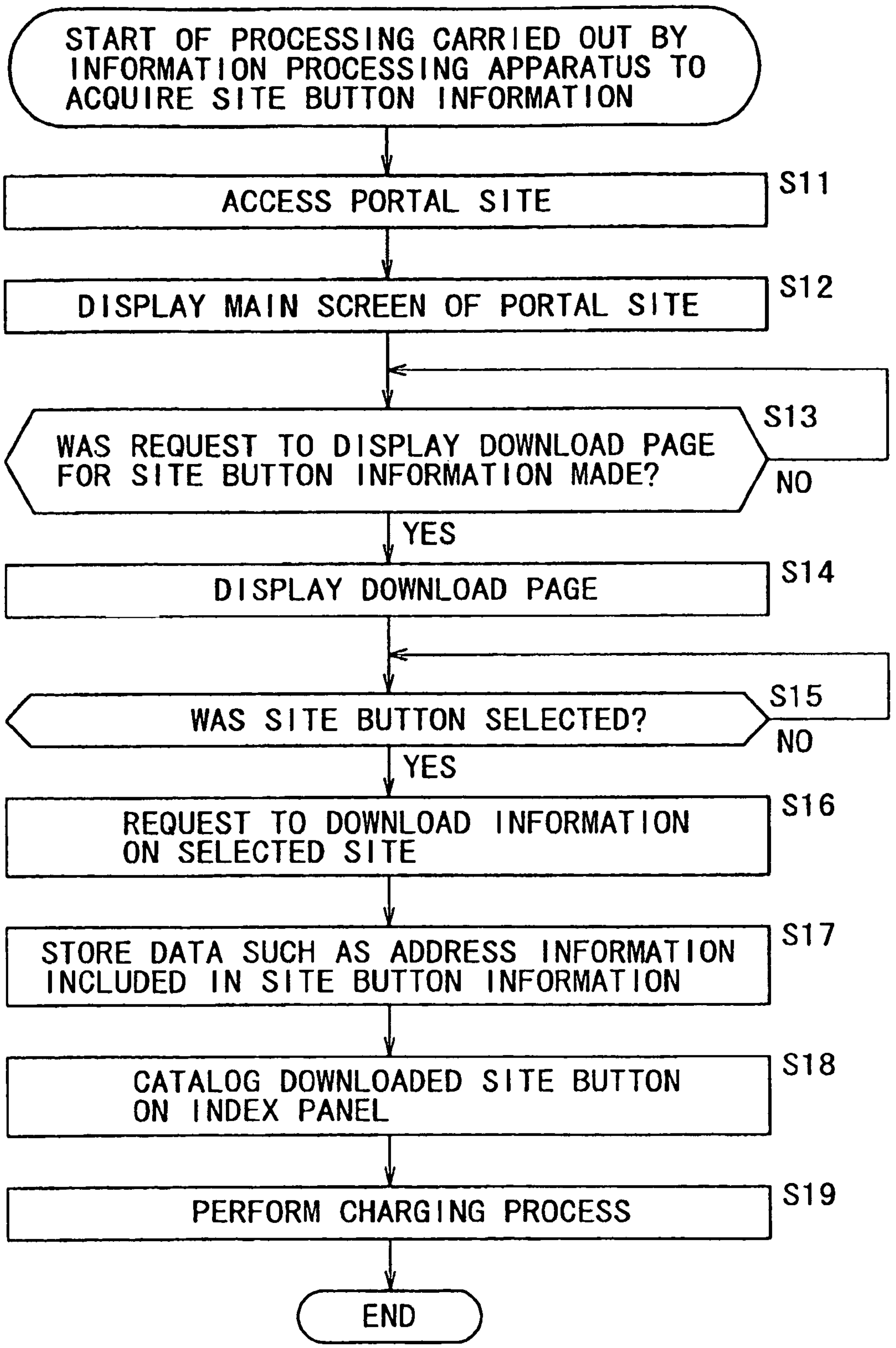
FIG. 8 shows a flowchart representing a process carried out by an information processing apparatus.

By referring to a flowchart shown in FIG. 8, the following description explains a process carried out by the information processing apparatus to acquire (or download) information on a site button.

At the step S11, in accordance with a command given by the user, the CPU 81 employed in the base station 21 controls the communication unit 87 to make an access to a portal site managed by the portal-site management apparatus 61.

In an operation to inspect a portal site by making such an access, the user typically operates the index display button of the operation unit 32 provided on the display apparatus 31 in order to display the index panel 1 like the one shown in FIG. 3 on the LCD 34 and then operates the Internet button 4 by using the touch pen 33.

If the CPU 111 employed in the display apparatus 31 determines in accordance with an input from the touch panel 116 that the Internet button 4 has been operated, the CPU 111 controls a transmitted-signal generation unit 125 to generate a control signal making a request for an access to the portal site and transmit the signal to the base station 21 by way of the communication antenna 118 after being subjected to a predetermined process in the transmission process unit 126.

In the base station 21, the communication antenna 96 receives the control signal and the reception process unit 94 carries out a predetermined process on the signal. The processed control signal is then supplied to the CPU 81.

When an access to the portal site is made in the processing described above, the CPU 81 employed in the base station 21 acquires an HTML file of a main screen from the portal-site management apparatus 61 at the next step S12 and displays the screen on the LCD 34.

To put it concretely, the HTML file received by the communication unit 87 is supplied to the terminal 90-2 of the changeover switch 90 by way of the bus 82 to be passed on by the changeover switch 90 to the compression process unit 91. The compression process unit 91 compresses the HTML file supplied thereto into data of a predetermined format and supplies the compressed data to the communication buffer 92. With a predetermined timing, the communication buffer 92 outputs the compressed data to the transmission process unit 93, which then carries out processes on the data. The processes include modulation processing and digital-to-analog conversion processing. The transmission process unit 93 transmits a result of the processes to the display apparatus 31 by way of the communication antenna 96 under control executed by the communication control unit 95. It is to be noted that, if the HTML file does not need to be compressed, the compression processing can be eliminated. In this case, uncompressed data of the HTML file is transmitted to the display apparatus 31.

In the display apparatus 31, the reception process unit 120 receives the HTML file from the communication antenna 118 and carries out processes on the file. The processes include predetermined demodulation processing and analog-to-digital conversion processing. The reception process unit 120 supplies data obtained as a result of the processes to the reception buffer 121, which outputs the data to the decompression process unit 122 with a predetermined timing. If the data supplied to the decompression process unit 122 is compressed data, the decompression process unit 122 decompresses the data to produce a picture signal representing a main screen and supplies the signal to the picture signal process unit 123. The picture signal process unit 123 displays the main screen based on the picture signal supplied thereto on the LCD 34.

Figure 9:
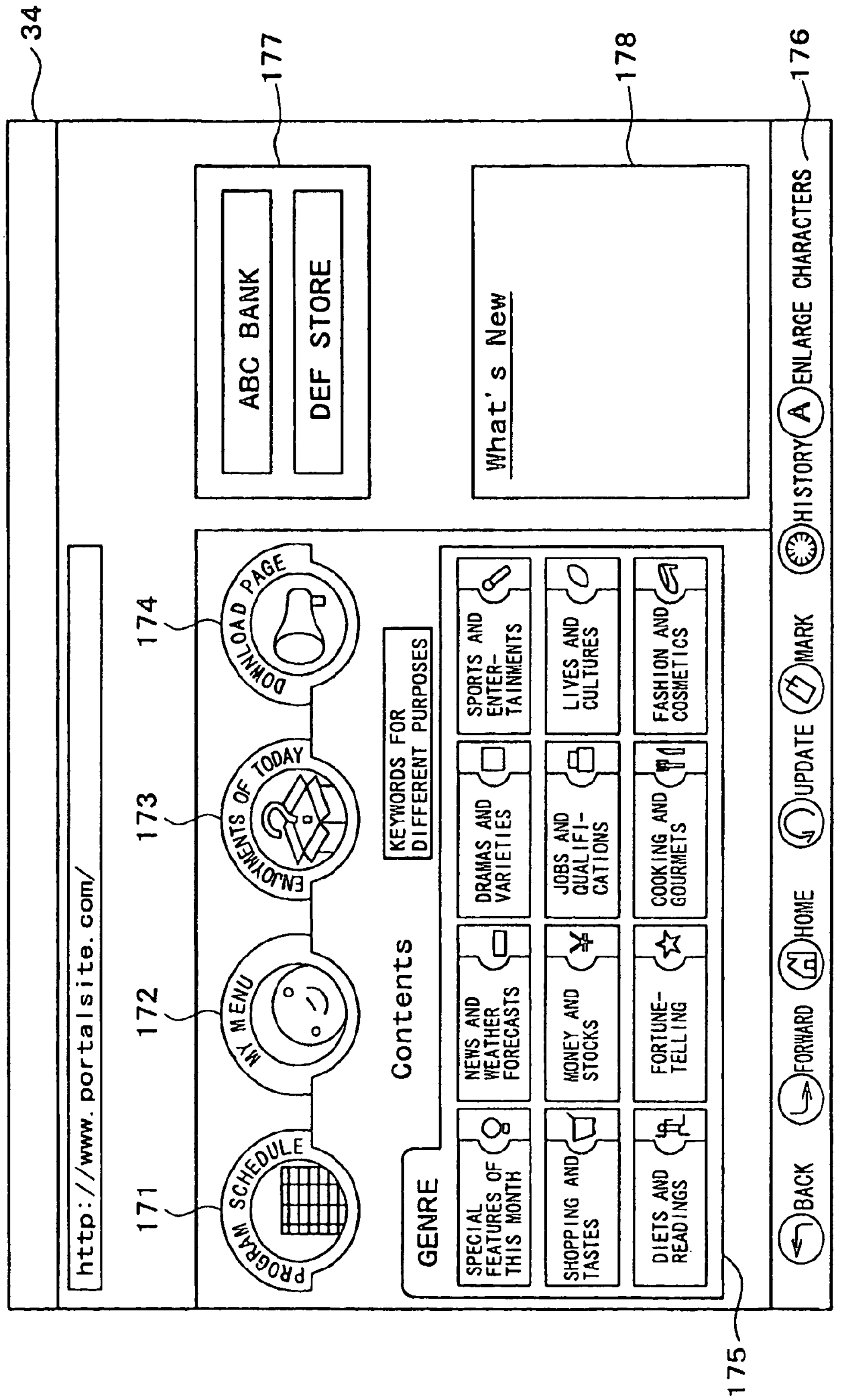
FIG. 9 is a diagram showing a typical display appearing on the display apparatus.

FIG. 9 is a diagram showing a typical display of the main screen of the portal site.

On the upper left side of the typical display of the main screen shown in FIG. 9, a program display button 171, a my-menu button 172 and an enjoyment button 173 appear. The program display button 171 is a button to be operated in order to display an EPG (Electronic Program Guide). The my-menu button 172 is a button to be operated in order to display a customized menu. The enjoyment button 173 is a button to be operated in order to display information to be enjoyed today.

At an adjacent location on the right side of the enjoyment button 173, there is displayed a download page button 174 to be operated in order to display the download page for downloading information on a site button.

On a row beneath the row displaying the program display button 171 to the download page button 174, there is displayed a content menu display portion 175 for showing a menu of a variety of contents. The user is allowed to select a desired content from the menu.

At an adjacent location on the right side of the program display button 171 to the download page button 174, there is displayed a banner advertisement display portion 177 for showing a variety of banner advertisements. Below the banner advertisement display portion 177, there is displayed a new-information display portion 178 for showing new information.

It is to be noted that a toolbar 176 is provided at the bottom of the LCD 34. The toolbar 176 allows the user to carry out a variety of operations by using the touch pen 33.

With the main screen like the one of FIG. 9 displayed, at the step S13, the CPU 81 employed in the base station 21 forms a judgment as to whether or not the user has entered a command to display the download page used to download information on a site button. This judgment is formed repeatedly till such a command is entered by the user in a state of waiting for the user to enter the command.

When the CPU 111 employed in the display apparatus 31 detects an operation carried out on the download page button 174 on the basis of an output generated by the touch panel 116, as described above, a signal making a request for an access to the download page is generated and transmitted to the base station 21.

Then, at the next step S14, the CPU 81 employed in the base station 21 makes an access to a location for storing the download page and then displays the download page on the LCD 34.

Much like the reception of the main screen described above, the communication unit 87 employed in the base station 21 receives the HTML file of the download page, which appears on the LCD 34 after various kinds of processing have been carried out in the base station 21 and the display apparatus 31.

Figure 10:
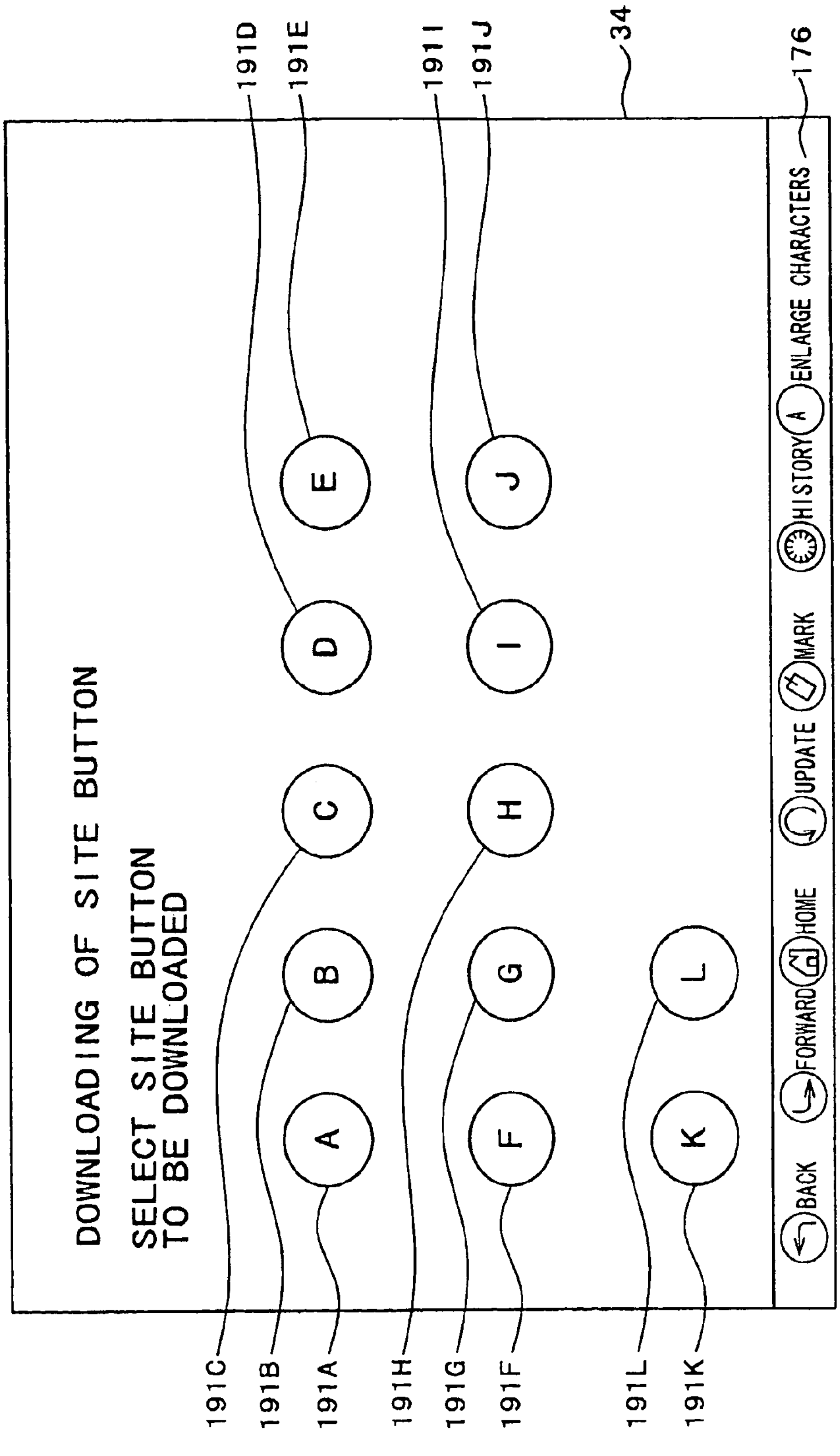
FIG. 10 is a diagram showing another typical display appearing on the display apparatus.

FIG. 10 is a diagram showing a typical display showing the download page.

As shown in the figure, the display shows a typical message saying: “Select a site button for downloading”. Under the message, the select buttons for specifying a site button among a variety of site buttons cataloged in the processing shown in FIG. 7 are displayed.

At the left end of the first row of the array, site button A denoted by reference numeral 191A, site button B denoted by reference numeral 191B are displayed. The select button 191A is a button to be operated in order to download information on the site button 71 shown in FIG. 3. The select button 191B is a button to be operated in order to download information on the site button 72 shown in FIG. 3. Along the array, similar select buttons follow the select button 191B. At the end of the array, site button L denoted by reference numeral 191L is displayed. Likewise, the last select button 191L is a button to be operated in order to download information on a site button L. In the display shown in the figure, each of the select buttons is marked with a text. It is to be noted, however, that a select button may be displayed along with a picture for a site associated with the select button.

The user selects one of the site buttons appearing on the download page shown in the figure. As described above, a site button is a button to be operated in order to make an access to a desired site. The user may additionally catalog the selected site button in the index panel 1.

In the case of the index panel 1 shown in FIG. 3, the user has selected the select buttons 191A and 191B to catalog the site buttons 71 and 72 in the index panel 1 as well as download information on the site buttons 71 and 72 respectively. The site buttons 71 and 72 in the index panel 1 are buttons to be operated in order to display the screen of sites A and B respectively.

Referring back to FIG. 8, at the step S15, on the basis of a signal received from the display apparatus 31, the CPU 81 employed in the base station 21 forms a judgment as to whether or not the user has selected a site button, the information on which is to be downloaded (that is, a judgment as to whether or not the user has operated one of the select buttons 191A to 191L appearing on the download page). This judgment is formed repeatedly till a site button is selected by the user in a state of waiting. As the CPU 81 determines that a site button has been selected, the flow of the process goes on to a step S16.

At the step S16, the CPU 81 requests the portal-site management apparatus 61 to download information on the site button selected by the user. Then, at the next step S17, the CPU 81 stores an address included in the downloaded information on the site button in typically the flash memory 115 employed in the display apparatus 31.

Subsequently, at the next step S18, the site button, the information on which was downloaded, is cataloged (displayed) on the index panel 1.

Assume for example that the user operates the select button 191C by using the touch pen 33 in order to download information on a site button to be operated in order to display the screen of site C. In this case, at the step S16, the CPU 81 employed by the base station 21 requests the portal-site management apparatus 61 to download information on the site button, which is associated with site C.

Then, at the next step S17, the CPU 81 transmits the information on the site button associated with site C received by the communication unit 87 as to the display apparatus 31 as described above. The CPU 111 employed in the display apparatus 31 receives the site-button information from the base station 21. The CPU 111 then stores the address information of site C included in the site-button information into the flash memory 115.

Subsequently, at the next step S18, the CPU 111 displays the site button associated with site C typically at an adjacent location on the right side of the site button 72.

When the user operates the site button associated with site C, the display apparatus 31 informs the base station 21 of the address of site C. On the basis of the HTML file acquired by the base station 21, the screen of site C is finally displayed on the LCD 34. A process carried out by the information processing apparatus to make an access to a site specified by a site button will be described hereunder.

As described above, the address information of a site button is stored in the flash memory 115 employed in the display apparatus 31. It is to be noted, however, that the address information can also be stored in the base station 21 as well.

Then, at the next step S19, the CPU 81 carries out a charging process to compute a fee (price) for the downloaded information on the site button. When the portal-site management apparatus 61 makes a request that the portal-site management apparatus 61 be informed of the number of a credit card, for example, the CPU 81 requests the display apparatus 31 to display a screen for entering the number of a credit card on the LCD 34. The portal-site management apparatus 61 is then informed of a credit card number entered to the screen.

As an alternative, information such as the number of a credit card is cataloged in advance in the portal site management apparatus 61 and a user ID based on such information is issued to the user. In this case, a charging process based on a user ID is carried out. In this case, a screen for inputting a user ID is displayed on the LCD 34 so as to allow the user to enter his/her own user ID.

The process carried out as described above allows the user to customize the index panel 1 as the user likes so that the user is capable of displaying the screen of a desired web site in the same way as the capability of selecting a television program. It is to be noted that the user is also allowed to delete a site button that is no longer necessary.

Figure 11:
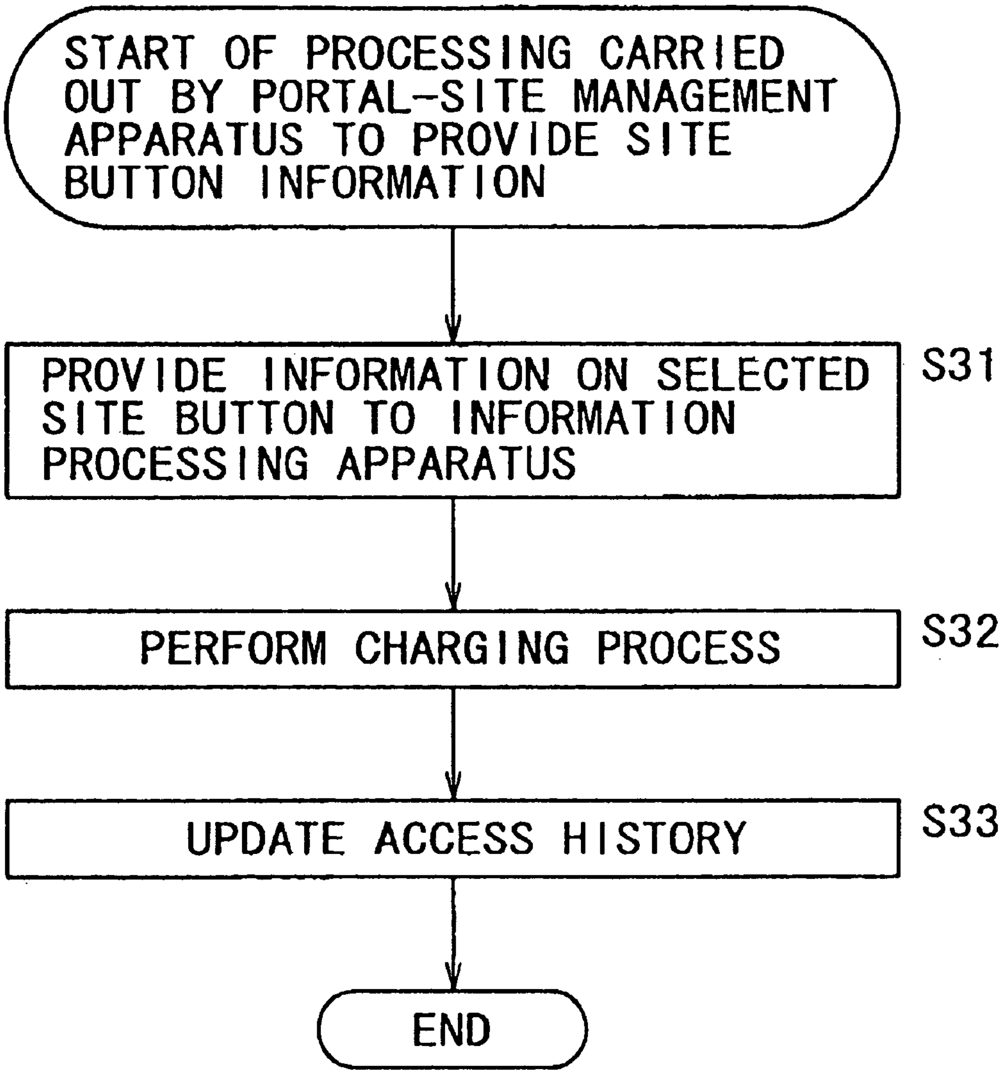
FIG. 11 shows a flowchart representing another process carried out by the portal-site management apparatus.

By referring to a flowchart shown in FIG. 11, the following description explains a process carried out by the portal-site management apparatus 61 to provide information on a site button.

At the step S31, when the information processing apparatus requests the portal-site management apparatus 61 to download information on a site button (that is, when one of the select buttons 191A to 191L on the download page shown in FIG. 10 is operated), the CPU 141 reads out the information on the selected site button from the site-button information storage unit 149 and provides (transmits) the information to the information processing apparatus by way of the communication unit 148.

Then, at the next step S32, the CPU 141 carries out a charging process for the provided information on the site button. For example, the CPU 141 issues a request for a notice of a credit card number to the information processing apparatus and a predetermined amount of money is collected by using the credit card number given by the information processing apparatus at the request. Typically, the predetermined amount of the collected money is several hundred yen for every downloaded information on a site button.

As an alternative, information including the number of a credit card is stored in the user management information storage unit 151 for each issued user ID. In this case, the CPU 141 issues a request for a notice of a credit card number to the information processing apparatus and a charging process is carried out on the basis of the user ID given at the request.

Then, at the next step S33, the CPU 141 updates information on the user making the request for the downloading of the information on the site button. The information includes an access record and a record of purchasing information on a site button.

The institution managing portal sites can gain a profit by selling information on a site button. In addition, the institution managing portal sites may also collect money from the provider of the information on a site button as a fee for cataloging the information in the portal-site management apparatus 61. In this case, the provider of the information on a site button is an institution managing the content management apparatus 62-1 to 62-3.

Figure 12:
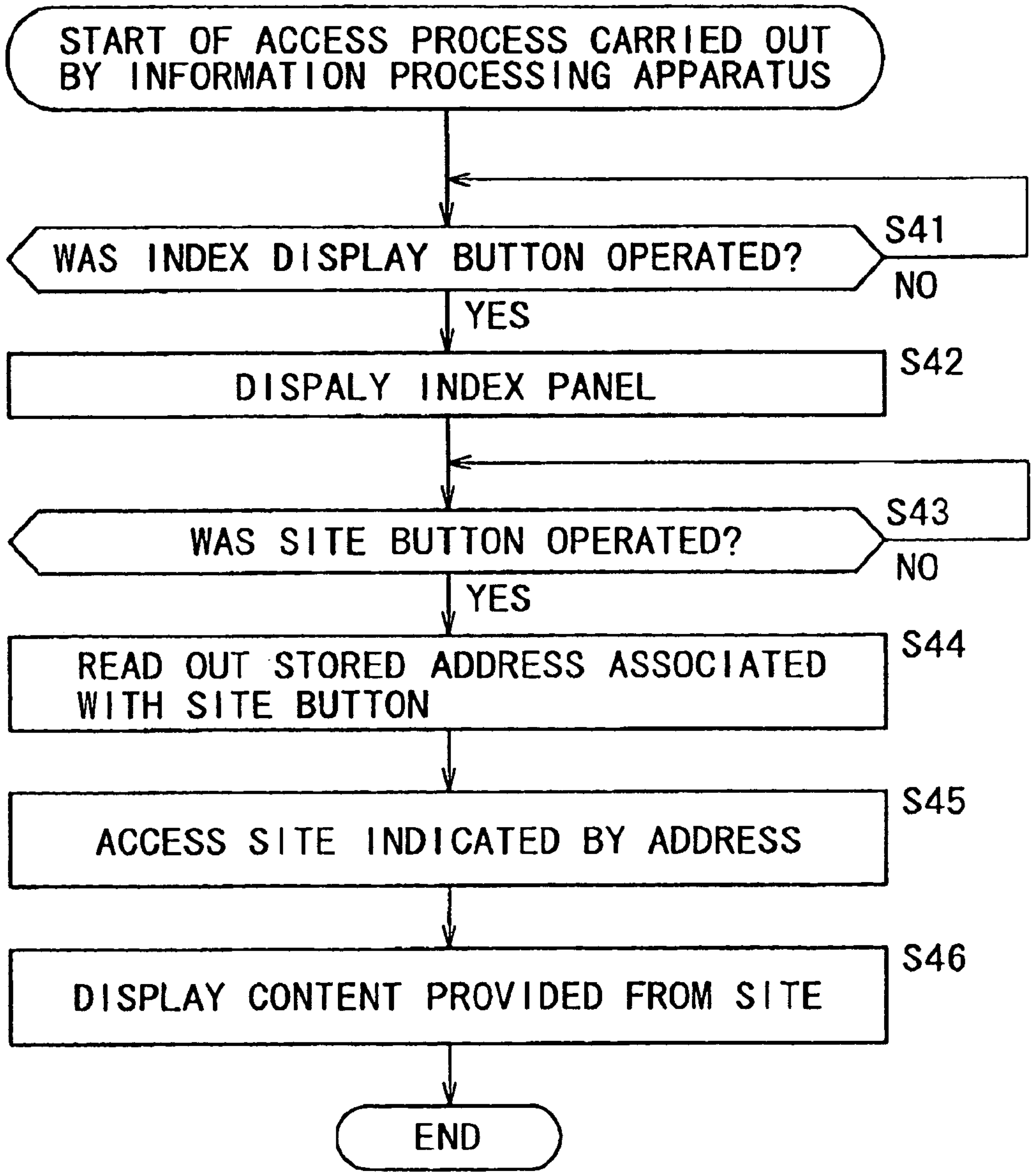
FIG. 12 shows a flowchart representing another process carried out by the information processing apparatus.

By referring to a flowchart shown in FIG. 12, the following description explains an access process carried out by the information processing apparatus to make an access to a site indicated by an operated site button.

At the step S41, the CPU 111 employed in the display apparatus 31 forms a judgment as to whether or not the index display button provided on the operation unit 32 has been operated. This judgment is formed repeatedly till the index display button is operated in a state of waiting. As the CPU 111 determines that the index display button has been operated, the flow of the process goes on to a step S42 at which the CPU 111 controls the picture signal process unit 123 to display the index panel 1 on the LCD 43.

If information on site buttons has already been downloaded in the processes described above, the index panel 1 like the one shown in FIG. 3 is displayed on the LCD 34.

Then, at the next step S43, on the basis of an output from the touch panel 116, the CPU 111 forms a judgment as to whether or not a site button appearing on the index panel 1 has been operated. If the CPU 111 determines that a site button has been operated, the flow of the process goes on to a step S44.

At the step S44, the CPU 111 reads out an address of a site associated with the operated site button from the flash memory 115 and generates a signal specifying the address as a command to make an access to the address. The CPU 111 then transmits the signal to the base station 21.

Then, at the next step S45, the CPU 81 employed in the base station 21 makes an access to a predetermined site specified by the address included in the signal received from the display apparatus 31.

For example, assume that the user operates the site button 71 appearing on the index panel 1 shown in FIG. 3. In this case, the address of site A is read out and transmitted to the base station 21 after being subjected to a predetermined process. The CPU 81 employed in the base station 21 then makes an access to site A based on the supplied information, to acquire an HTML file and transmits the file to the display apparatus 31.

Then, at the next step S46, the CPU 111 employed in the display apparatus 31 carries out various kinds of processing described above on the HTML file received from the base station 21 and displays a content (or a web page) provided from the site on the LCD 34.

The process described above allows the index panel 1 to be displayed and a desired site to be shown by merely operating the site button provided on the index panel 1 for the site even while the user is watching a television program. That is to say, the operatability is improved if compared with the conventional system in which the index panel 1 is first displayed, a connection with the Internet 51 is then established and a desired site is finally selected.

It is to be noted that another kind of site button can be provided. The site button of the kind just mentioned is operated not only to display the screen of a specified site, but also make an access to an apparatus for managing streaming contents so that a streaming content is displayed on the LCD 34.

FIG. 13 is a diagram showing a further typical display of the index panel 1. At an adjacent location on the right side of the site button 72, a streaming content button 201 is displayed. The streaming content button 201 is a button to be operated in order to make an access to a site for managing streaming contents so as to display a streaming content.

When the user operates the streaming content button 201, a stored address associated with the streaming content button 201 is read out and an access to a site indicated by the address is made in the same way as the processes, which are carried out when the site button is operated as described above. Then, as the portal-site management apparatus 61 transmits a streaming content by way of the Internet 51, the base station 21 and the display apparatus 31 carry out a variety of processes described above to display the stream content on the LCD 34.

In this way, the user is capable of selecting and watching a streaming content in the same sense as the operations to select and watch a television program conveyed by a television broadcast wave.

In addition, the portal-site management apparatus 61 may compile a guide sequence of streaming contents and their showing times on the basis of information stored in the content management information storage unit 150 to be included in a program schedule, which is then provided to the information processing apparatus.

FIG. 14 is a diagram showing a typical program schedule, which appears on the LCD 34 when the program display button 171 shown in FIG. 9 is operated.

In this schedule of programs, the vertical direction is the direction in which time lapses. The schedule of programs shows television programs broadcasted by a 'CHK General' channel, a 'CHK Education' channel, a 'JSY Television' channel, a 'TSK Television' channel, a 'Fuku Television' channel, a 'Television Yuhi' channel and a 'Television Tozai' channel, which are arranged as columns in an order starting from the left side.

At the right-side end of the schedule of programs, there is displayed a streaming content guide column 211 created by the portal-site management apparatus 61 by compiling the guide sequence of streaming contents and their guide times as described above.

In the figure, the time 13:00 is used as a start time. The streaming content guide column 211 includes content 1, content 2, content 3, content 4 and content 5, which are listed in a chronological order. Thus, when the user merely operates the streaming content button 201 appearing on the index panel 1 as shown in FIG. 13 without the need to change (or specify) an access target, the streaming contents are displayed on the LCD 34 in the order the contents are listed in the streaming content guide column 211.

That is to say, when the user operates the streaming content button 201, the portal-site management apparatus 61 provides the information processing apparatus with addresses of the streaming contents set in the streaming content guide column 211 and times to change the access target from the address of a current streaming content to the address of the next streaming content. The provided addresses of the streaming contents are stored typically in the flash memory 115 employed in the display apparatus 31 and used as a base for selecting an access target.

Thus, the user is capable of watching streaming contents in the same way as television programs broadcasted by broadcasting stations in accordance with a schedule shown in a schedule of programs.

In addition, a desired streaming content can be displayed on the LCD 34 without regard to the show time thereof indicated in a displayed schedule of programs like the one shown in FIG. 14. In this case, each display of the streaming content shown on the streaming content guide column 211 is linked to a server used for storing the content. The user is allowed to select a desired streaming content by using the touch pen 33 in order to display the content. For example, the user is allowed to select content 3 even during a time frame allocated to content 1.

Furthermore, the display (or the picture) of the streaming content button 201 appearing on the index panel 1 can be modified in accordance with the substance of a streaming content supposed to be shown at the present time frame. In a time frame allocated to a baseball content, for example, a picture such as a ball or bat of the baseball is displayed on the streaming content button 201. In a time frame allocated to content about soccer, on the other hand, a picture of a soccer ball is displayed on the streaming content button 201.

In this way, the user is capable of verifying the substance of a streaming content assigned to the present time frame without making an access to the portal-site management apparatus 61 in order to display a schedule of programs like the one shown in FIG. 14.

It is to be noted that the streaming contents set in the streaming content guide column 211 can be obtained as a result of compilation in the portal-site management apparatus 61 on the basis of user information such as favorites cataloged in advance by the user.

That is to say, the CPU 141 employed in the portal-site management apparatus 61 analyzes favorites with the user on the basis of information stored in the user management information storage unit 151 in order to form streaming contents. In the case of a user fond of sports, for example, guide times of streaming contents are set so as to display streaming contents of sports continuously. Then, information on the set streaming content guide column 211 is stored, being associated with a user ID of the user for which the information is formed. When the information processing apparatus makes an access to the portal-site management apparatus 61 by specifying a user ID, the portal-site management apparatus 61 reads out the stored information and provides the information to the user.

In addition of a fee for providing such information on a site button and a fee for providing such information on a streaming content button, a fee for providing a program schedule formed on the basis of favorites with the user can also be charged.

In the explanation described above, data such as information on a site button is presented to the information processing apparatus by way of the Internet 51. As also described above, however, such data can also presented to the information processing apparatus by using a storage medium such as the memory card 37. As another alternative, data such as information on a site button is installed in advance in the information processing apparatus.

Figure 15:
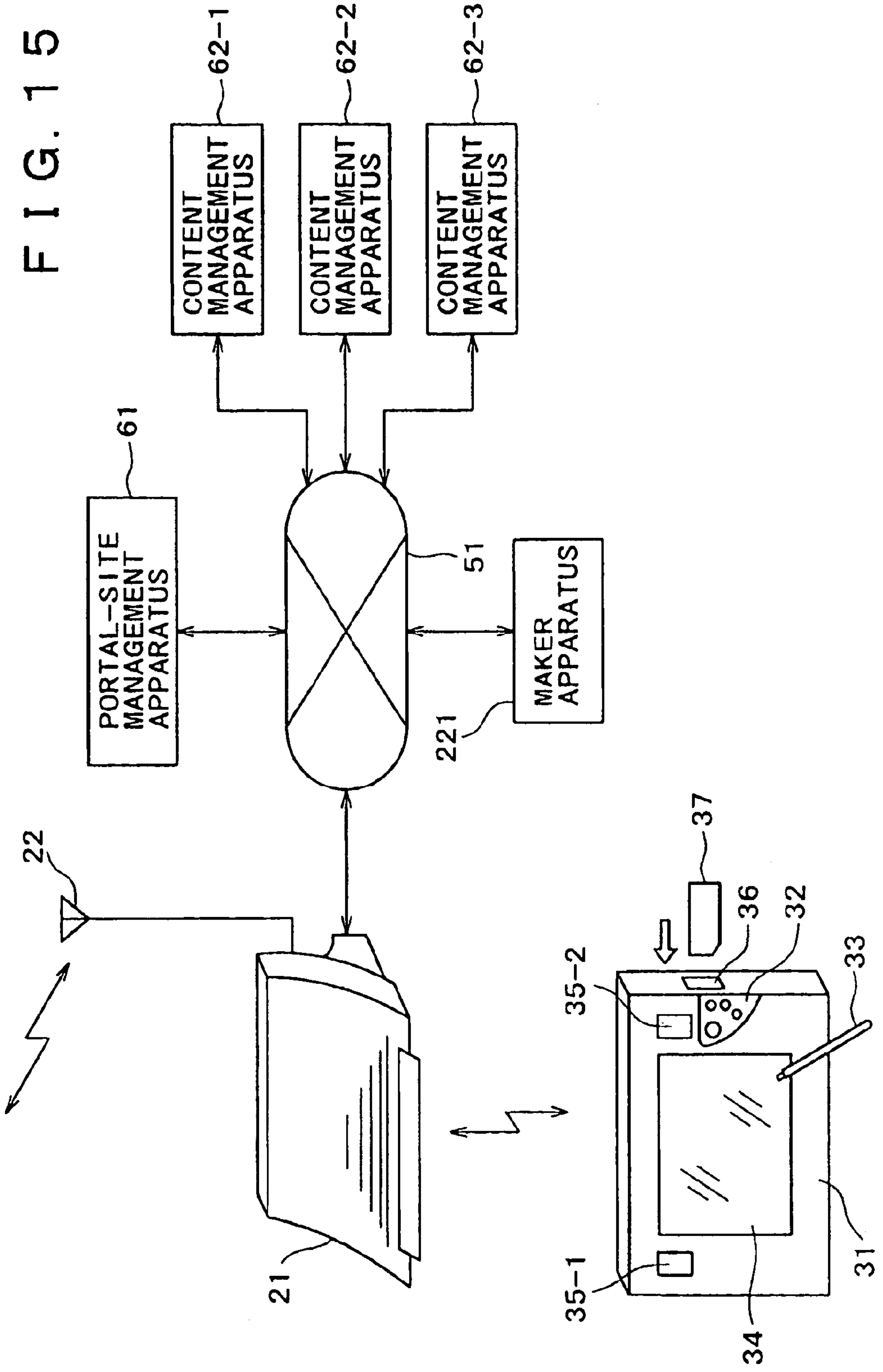
FIG. 15 is a diagram showing a typical configuration of another information providing system to which the present invention is applied.

FIG. 15 is a diagram showing another typical configuration of the information providing system to which the present invention is applied. Components identical with their respective counterparts shown in FIG. 2 are denoted by the same reference numerals and their explanations are repeated properly only if necessary.

A maker apparatus 221 is managed typically by a manufacturer producing the memory card 37 and/or the information processing apparatus. In accordance with a command issued by the portal-site management apparatus 61, the maker apparatus 221 creates a program to be stored in the memory card 37 or the information processing apparatus. The program created by the maker apparatus 221 and stored in the memory card 37 or the information processing apparatus includes site button information provided by the portal-site management apparatus 61.

Thus, when a memory card 37 containing information on a site button is sold to a user, money representing a fee for the information on a site button can be charged to the user independently of the price of the memory card 37. If information on a site button is installed in the information processing apparatus in advance, a fee for the preinstalled information on a site button can be charged to the institution managing the content management apparatus 62-1 to 62-3 that has made a request for the pre-installation of the information on a site button.

It is to be noted that the portal-site management apparatus 61 and the maker apparatus 221 do not have to be implemented as a plurality of apparatus physically separated from each other as shown in FIG. 15. Instead, they can be implemented in a single apparatus.

Figure 16:
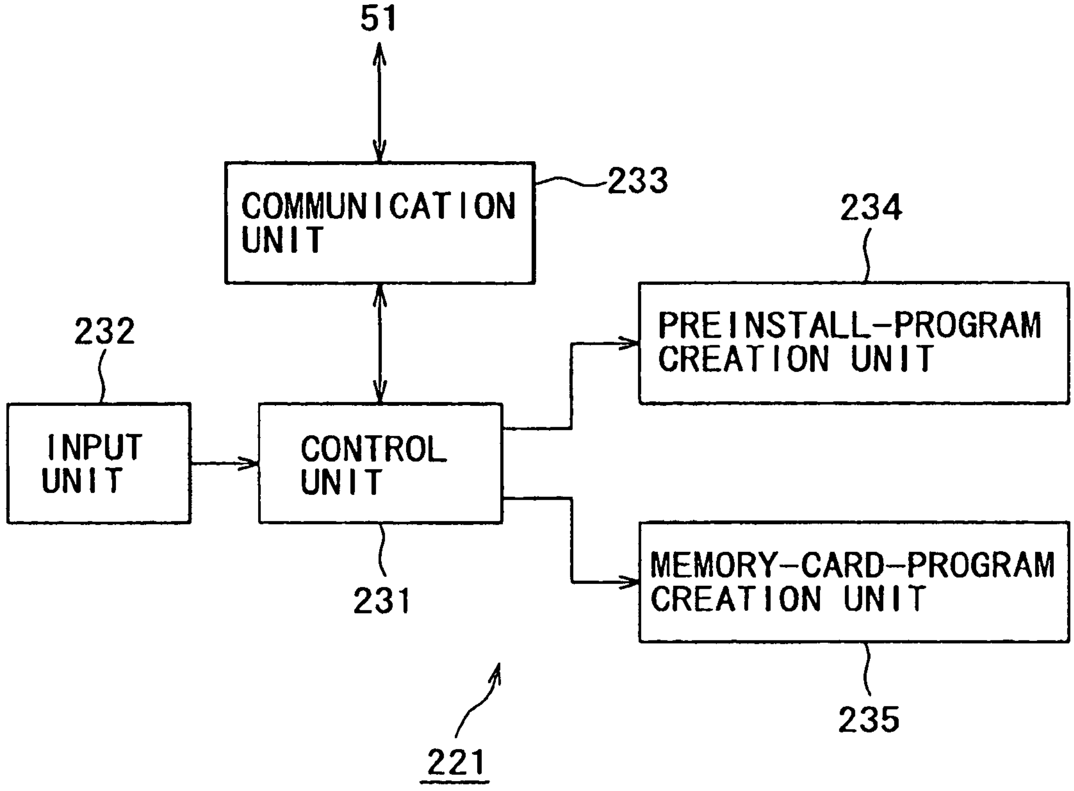
FIG. 16 is a block diagram showing a maker apparatus shown in FIG. 15.

FIG. 16 is a block diagram showing a typical configuration of the maker apparatus 221.

A control unit 231 activates a control program stored in a memory embedded therein to control all operations of the maker apparatus 221 in accordance with an input entered by a person in charge of management of the maker apparatus 221 via an input unit 232.

For example, the control unit 231 acquires information on a site button from the portal-site management apparatus 61, which transmits the information to a communication unit 233 employed in the maker apparatus 221 by way of the Internet 51. The communication unit 233 passes on the information on a site button to a preinstall-program creation unit 234 or a memory-card-program creation unit 235.

The preinstall-program creation unit 234 creates a program to be preinstalled in the information processing apparatus and pre-install the created program in the information processing apparatus. The program created by the preinstall-program creation unit 234 also includes the information on a site button in addition to applications such as the function to watch a television program, the mail function and the album function, which have been described above. An information processing apparatus with such a program preinstalled therein is thus capable of carrying out the above-described processing to display a site button on the index panel 1 without downloading information on the site button.

On the other hand, the memory-card-program creation unit 235 creates a program to be stored in the memory card 37 and stores the program in the memory card 37. The program created by the memory-card-program creation unit 235 is a program for installing information on a site button in the information processing apparatus. When the user mounts the memory card 37 containing the program on the memory card slot 36, the site button can be displayed on the index panel 1.

Operations carried out by the information providing system shown in FIG. 15 are explained as follows.

Figure 17:
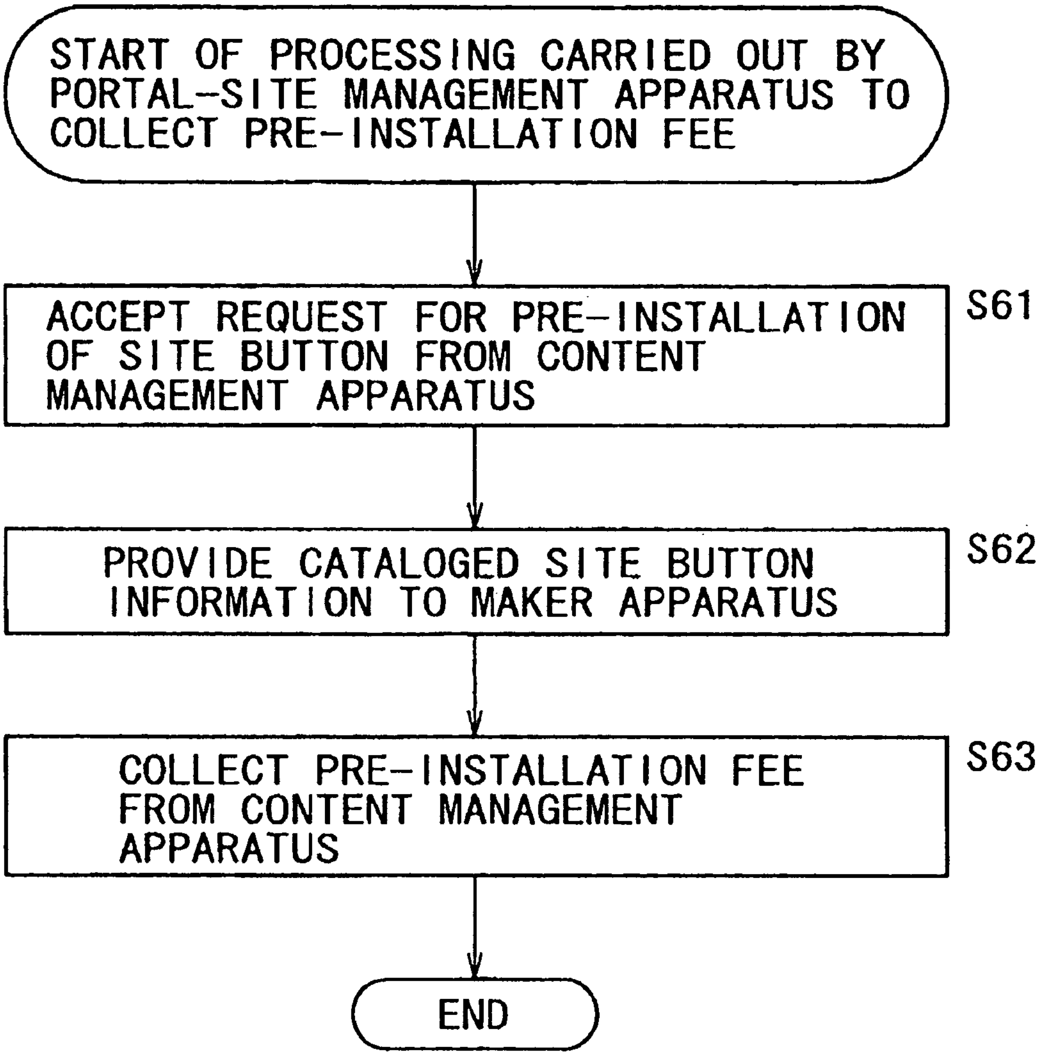
FIG. 17 shows a flowchart representing a further process carried out by the portal-site management apparatus.

First of all, by referring to a flowchart shown in FIG. 17, the following description explains a process carried out by the portal-site management apparatus 61 to collect a pre-installation fee.

At the step S61, the CPU 141 accepts a request made by any one of the content management apparatus 62-1 to 62-3 to preinstall information on a site button in the information processing apparatus. Then, at the next step S62, the CPU 141 reads out the site button information of the site managed by the content management apparatus 62-1 to 62-3 from the site-button information storage unit 149 and controls the communication unit 148 to transmit the information on a site button to the maker apparatus 221.

Subsequently, at the next step S63, the CPU 141 collects a pre-installation fee from one of the content management apparatus 62, which has made the request for the pre-installation. This is because the information processing apparatus is expected to make more accesses to the site associated with the site button by cataloging the information on a site button can be cataloged in the index panel 1 of the information processing apparatus as a default.

Figure 18:
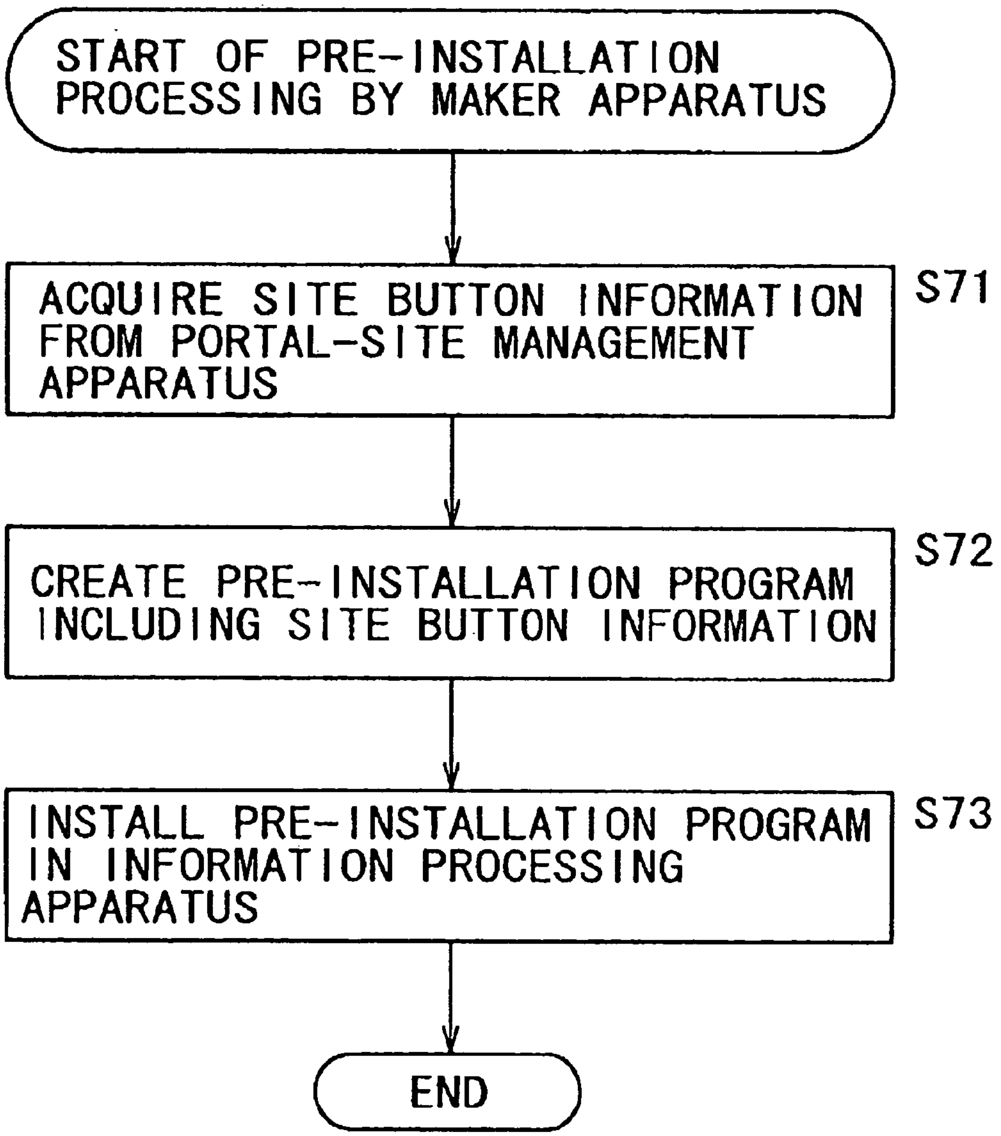
FIG. 18 shows a flowchart representing a process carried out by the maker apparatus.

By referring to a flowchart shown in FIG. 18, the following description explains a pre-installation process carried out by the maker apparatus 221.

At the step S71, the control unit 231 acquires information on a site button from the portal-site management apparatus 61. In the maker apparatus 221, the communication unit 233 receives the information on a site button and passes on the information to the preinstall-program creation unit 234.

Then, at the next step S72, the preinstall-program creation unit 234 creates a pre-installation program other than a variety of applications described earlier. The pre-installation program includes the information on a site button.

Subsequently, the preinstall-program creation unit 234 installs the pre-installation program created at the step S72 in an information processing apparatus produced by carrying out a predetermined process. The information processing apparatus including the preinstalled information on a site button is sold through a predetermined sales network such as shopping sites managed by the portal-site management apparatus 61.

In this way, the site button is displayed on the index panel 1 from the beginning so that the number of users making accesses to the site associated with the site button is expected to increase.

As described above, the portal-site management apparatus 61 provides information on a site button to the maker apparatus 221 by way of the Internet 51. It is to be noted, however, that the portal-site management apparatus 61 can of course provide information on a site button to the maker apparatus 221 by adopting a variety of methods. For example, the portal-site management apparatus 61 may provide information on a site button to the maker apparatus 221 by using any one of the recording mediums ranging from the magnetic disc 153 to the semiconductor memory 156 shown in FIG. 6.

By referring to a flowchart shown in FIG. 19, the following description explains a process carried out by the maker apparatus 221 to store information on a site button in the memory card 37.

The pieces of processing carried out at steps S81 and S82 are basically the same as those performed at the steps S71 and S72 respectively of the flowchart shown in FIG. 18. To be more specific, at the step S81, information on a site button is received from the portal-site management apparatus 61 and passed on to the memory-card-program creation unit 235. Then, at the next step S82, the memory-card-program creation unit 235 creates a program to be installed in the memory card. The program includes the information on a site button.

Subsequently, at the next step S83, the memory-card-program creation unit 235 stores the program created at the step S82 in the memory card 37.

The memory card 37 containing the stored information on a site button is sold through a predetermined sales network such as shopping sites managed by the portal-site management apparatus 61 to users of information processing apparatus to gain revenue from the sales.

In addition, it is possible to charge a fee for storing information on a site button in a memory card 37 to one of the content management apparatus 62-1 to 62-3, which has made a request to store the information in the memory card 37, in the same way as collecting a pre-installation fee for installation of information on a site button.

Figure 20:
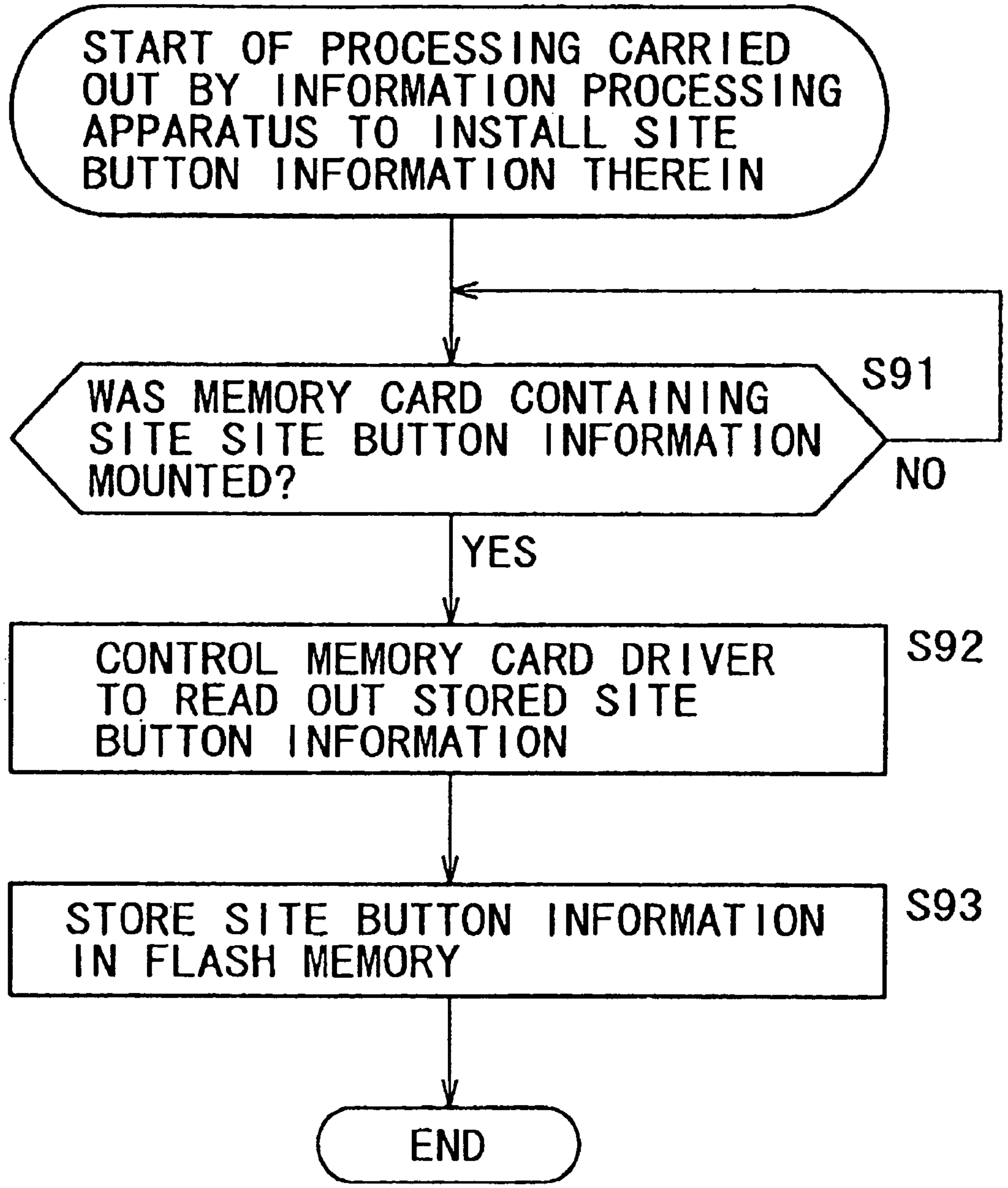
FIG. 20 shows a flowchart representing a further process carried out by the information processing apparatus.

By referring to a flowchart shown in FIG. 20, the following description explains a process carried out by the information processing apparatus to install information on a site button stored in a memory card 37.

At the step S91, the CPU 111 employed in the display apparatus 31 determines whether or not a memory card 37 containing stored information on a site button has been mounted on the memory card slot 36. This is performed repeatedly till a memory card 37 containing stored information on a site button is mounted on the memory card slot 36. As the CPU 111 determines at the step S91 that a memory card 37 containing stored information on a site button has been mounted on the memory card slot 36, the flow of the process goes on to a step S92 at which the CPU 111 controls the memory card drive 117 to read out the stored information on a site button from the memory card 37.

Then, at the next step S93, the CPU 111 stores the information on a site button read out from the memory card 37 into the flash memory 115. When the index panel display button of the operation unit 32 is operated, the site button, the information of which has been stored, is displayed on the index panel 1.

In this way, a site button can be added to the index panel 1 not only by downloading information on a site button, but also by reading out the information from the memory card 37.

In addition, information on a site button can be acquired not only through the Internet 51 or a memory card 37, but also by adopting a variety of methods. If the information processing apparatus is an apparatus designed for receiving digital television broadcasts, for example, information on a site button can be acquired from a digital television broadcast and the site button is then cataloged in the index panel 1.

In the embodiments described above, every time information on a site button is downloaded, a fee is charged to the user. However, another kind of fee can also be charged. For example, it is also possible to charge a fee depending on the length of a period to display the site button, the information of which has been downloaded, on the index panel 1.

In addition, the embodiments described above implement information processing apparatus including the base station 21 serving as a main apparatus and the display apparatus 31 serving as a display unit that can be used in a state of being separated from the main apparatus. However, the present invention can also be applied to a conventional apparatus such as the ordinary television receiver as long as the single apparatus can be connected to the Internet 51 and is capable of receiving television broadcast waves.

The series of processes described above can be carried out by using hardware or software.

If the series of processes is to be carried out by using software, programs composing the software are installed in the portal-site management apparatus 61 and the information processing apparatus from typically a network or a recording medium.

The recording medium from which the programs composing the software are to be installed is package media distributed to users separately from the main unit of the apparatus to present the programs to the users. Examples of the package media containing the programs are the magnetic disc 153 including a floppy disc, the optical disc 154 including a CD-ROM and a DVD, the magneto-optical disc 155 including an MD (Mini Disc, a trademark) and the semiconductor memory 156, which are shown in FIG. 6. In addition to the package media, the recording media includes the ROM 142 in which the programs can also be stored in advance.

It is needless to say that, in the description chapter, steps prescribing a program stored in a recording medium represent processes to be carried out in an order the steps are described along the time base. It is to be noted, however, that the steps do not necessarily represent such sequential processes. Instead, the steps may represent processes including those to be carried out concurrently or individually.

In addition, the technical term "system" used in the description chapter means an entire apparatus combination comprising a plurality of apparatus.

INDUSTRIAL APPLICABILITY

As described above, in accordance with the present invention, a first operation button to be operated in order to display a predetermined television program conveyed by a television broadcast wave as well as a second operation button to be operated in order to make an access to a specific content on a network are displayed and, in addition, the first and second operation buttons are displayed on the same screen to further improve operatability.

In addition, in accordance with the present invention, in order to increase revenue, operation button information is provided to an information processing apparatus to be stored therein as information required for displaying a second operation button to be operated in order to display a specific content on the same screen as a first operation button to be operated in order, to display a predetermined television program conveyed by a television broadcast wave.

The invention claimed is:

1. An information processing apparatus for processing contents available on a network and from at least one content source, said information processing apparatus comprising:

acquiring means for acquiring operation button information for displaying operation buttons selectively operable to access directly via said network a specific one of said contents from a list of button information supplied to said information processing apparatus; and display means for displaying said operation buttons acquired by said acquiring means and for displaying selectable operation buttons identifying the content available from said at least one content source, said operation buttons being displayed on a common display screen and being individually selectable by a user, wherein the acquiring means enables said user to acquire different sets of operation button information each time the user acquires operation button information, and wherein upon selecting an acquired operation button that is displayed, the information processing apparatus sends a signal specifying an address associated with the accessed operation button indicating one of said at least one content source that stores the contents over said network to a first information providing apparatus as a command to access the address and acquire from a second information providing apparatus content associated with said address and transmits the acquired content to the information processing apparatus; and wherein upon selecting a content-identifying operation button, the content identified by the selected content-identifying operation button is transmitted to the information processing apparatus from said content source, wherein the content associated with said address is streaming content, wherein the acquired content that is transmitted to the information processing apparatus is streaming video data, and wherein the second information providing apparatus provides to the user a streaming content button connecting to a list of favorite streaming contents complied by the second information providing apparatus based on user information stored in a user information storage unit.

2. An information processing apparatus for processing content available on a network and processing a television broadcast wave, said information processing apparatus comprising:

an acquisition section configured to acquire, from an operation button information list provided from an information providing device, operation button information required for displaying a first operation button to be operated in order to access a specific content, said information providing device being connected to the information processing apparatus via said network, wherein said information providing device stores the operation button information provided by a plurality of content managing devices managing the content, and provides the operation button information to the information processing apparatus as the operation button information list, the plurality of content managing devices being connected to the information providing device via said network; and a display processing section configured to display the first operation button according to the operation button information obtained by the acquisition section and a second operation button to be operated in order to display TV program transmitted by said television broadcast wave, wherein said first operation button and said second operation button are displayed on the same screen.

3. The information processing apparatus according to claim 2, wherein the acquisition section is configured to enable said user to acquire different sets of operation button information each time the user acquires the operation button information.

4. The information processing apparatus according to claim 2, wherein said acquisition section is used for acquiring the operation button information from a predetermined storage medium for storing the operation button information.

5. The information processing apparatus according to claim 2, the information processing apparatus is further provided with charging means for charging a fee for the operation button information.

6. The information processing apparatus according to claim 2, wherein, if the specific content, which is accessed when the first operation button is operated, is a streaming content with substance thereof varying from time frame to time frame, an appearance of the displayed first operation button is changed in accordance with the varying substance of the streaming content.

* * * * *